(12) United States Patent
Naujok

(10) Patent No.: US 11,831,731 B2
(45) Date of Patent: Nov. 28, 2023

(54) PROVING POSSESSION OF A COMMUNICATIONS DEVICE VIA A DIRECTED CONNECTION

(71) Applicant: Payfone, Inc., New York, NY (US)

(72) Inventor: Jeffrey Robert Naujok, Colorado Springs, CO (US)

(73) Assignee: PROVE IDENTITY, INC., New York, NY (US)

( * ) Notice: Subject to any disclaimer, the term of this patent is extended or adjusted under 35 U.S.C. 154(b) by 0 days.

(21) Appl. No.: 17/183,208

(22) Filed: Feb. 23, 2021

(65) Prior Publication Data

US 2022/0272158 A1    Aug. 25, 2022

(51) Int. Cl.
*H04L 67/146*      (2022.01)
*H04L 67/51*       (2022.01)

(52) U.S. Cl.
CPC ............ *H04L 67/51* (2022.05); *H04L 67/146* (2013.01)

(58) Field of Classification Search
None
See application file for complete search history.

(56) References Cited

U.S. PATENT DOCUMENTS

| 7,644,434 | B2 * | 1/2010 | Pollutro | H04L 63/067 726/7 |
| 8,606,640 | B2 * | 12/2013 | Brody | G06Q 30/0613 705/26.1 |
| 10,693,872 | B1 * | 6/2020 | Larson | H04L 63/0838 |
| 11,076,001 | B1 * | 7/2021 | Mohamed | H04L 47/803 |
| 11,165,586 | B1 * | 11/2021 | Rule | H04M 7/0027 |
| 2008/0084870 | A1 * | 4/2008 | Taylor | H04W 76/50 370/352 |
| 2008/0201401 | A1 * | 8/2008 | Pugh | H04L 29/12349 709/201 |
| 2010/0130169 | A1 * | 5/2010 | Narayanaswamy | H04M 15/51 455/445 |

(Continued)

OTHER PUBLICATIONS

PCT Application No. PCT/US22/16568: Demand & Response to Written Opinion filed Dec. 22, 2022, 31 pages, Doc 1880.

(Continued)

*Primary Examiner* — James A Edwards
(74) *Attorney, Agent, or Firm* — Berkeley Law & Technology Group, LLP

(57) ABSTRACT

Briefly, example methods, apparatuses, and/or articles of manufacture may be implemented, in whole or in part, to prove possession of a communications device, such as a mobile communications device. In a particular method, proving possession of a communications device may include receiving, from a client server, an indicator to indicate a communication services carrier servicing the communications device. The method may continue with generating a session identifier and a resource locator to direct the communications device to establish communications with an identity verifier at an address corresponding to the resource locator. The resource locator may be determined based, at least in part, on the indicator received from the client server. The method may additionally include the communications device transmitting one or more identifiers, determined, at least in part, from content stored within, or data derived from, memory of the communications device.

30 Claims, 5 Drawing Sheets

(56) References Cited

U.S. PATENT DOCUMENTS

| | | | |
|---|---|---|---|
| 2014/0053241 | A1 | 2/2014 | Norrman |
| 2015/0296379 | A1 | 10/2015 | Nix |
| 2016/0105540 | A1 | 4/2016 | Kwon |
| 2016/0277930 | A1 | 9/2016 | Li |
| 2017/0041964 | A1 | 2/2017 | Yerli |
| 2019/0037401 | A1 | 1/2019 | Egner et al. |
| 2019/0312878 | A1* | 10/2019 | Brown .................. H04L 63/045 |
| 2019/0327609 | A1 | 10/2019 | Schell et al. |
| 2020/0374694 | A1 | 11/2020 | Fan et al. |
| 2020/0380598 | A1* | 12/2020 | Spector .................. G06N 20/00 |
| 2020/0412539 | A1 | 12/2020 | Uy |
| 2021/0029522 | A1 | 1/2021 | Cao |
| 2021/0081632 | A1* | 3/2021 | Batchu .................... H04W 4/80 |
| 2021/0105142 | A1 | 4/2021 | Lee et al. |

OTHER PUBLICATIONS

PCT Application No. PCT/US22/39174: PCT Application filed Aug. 2, 2022, 65 pages, Doc 1870.

PCT Application No. PCT/US22/39174: International Search Report and Written Opinion dated Dec. 6, 2022, 13 pages, Doc 1871.

U.S. Appl. No. 17/407,041: Notice of Publication dated Feb. 23, 2023, p. 1, Doc 1902.

U.S. Appl. No. 17/407,041: Non-Final Office Action dated Feb. 27, 2023, 32 pages, Doc 1903.

PCT/US22/16568: PCT Application filed Feb. 16, 2022, 63 pages, Doc 1807.

PCT/US22/16568: International Search Report and Written Opinion dated Mar. 4, 2022, 13 pages, Doc 1808.

U.S. Appl. No. 17/407,041: Patent Application filed Aug. 19, 2021, 67 pages, Doc 1809.

U.S. Appl. No. 17/407,041: Filing Receipt and Notice to File Missing Parts dated Aug. 31, 2021, 6 pages, Doc 1810.

U.S. Appl. No. 17/407,041: Response to File Missing Parts filed Oct. 7, 2021, 6 pages, Doc 1811.

U.S. Appl. No. 17/407,041: Updated Filing Receipt dated Oct. 13, 2021, 4 pages, Doc 1812.

U.S. Appl. No. 17/475,159: Patent Application filed Sep. 14, 2021, 69 pages, Doc 1813.

U.S. Appl. No. 17/475,159: Filing Receipt dates Sep. 27, 2021, 3 pages, Doc 1814.

BR Application No 1120230168767: Brazil Application filed Aug. 22, 2023, 39 pages, Doc 1952.

CA Application No 3209181: Canada Application filed Aug. 21, 2023, 75 pages, Doc 1953.

EP Application No 227602224: European Application filed Aug. 21, 2023, 6 pages, Doc 1954.

IN Application No 202347056479: India Application filed Aug. 23, 2023, 59 pages, Doc 1955.

U.S. Appl. No. 17/407,041: Final Office Action dated Aug. 28, 2023, 21 pages, Doc 1961.

* cited by examiner

PROVING POSSESSION OF A COMMUNICATIONS DEVICE VIA A DIRECTED CONNECTION

BACKGROUND

1. Field

The present disclosure relates generally to performing electronic transactions, such as by way of an electronic communications device, which may involve verifying or proving that an individual is currently in possession of, or at least collocated with, a particular communications device.

2. Information

The World Wide Web or simply the Web, as enabled by the Internet, has grown rapidly in recent years at least partially in response to the relative ease by which a wide variety of transactions can be performed or enabled via the Internet by way of a communications device. As a consequence of widely available Internet connections, including connections to the Internet facilitated by mobile cellular communication services, for example, a mobile subscriber may shop and/or browse for virtually any product and/or service utilizing a communications device. However, in such an environment, in which electronic- and/or Internet-based commerce has become increasingly common, occurrences of fraud and deception, unfortunately, can also occur. To reduce the instances of fraud and deception, fraud-protection processes and/or procedures may be implemented. Such implementations may be utilized, for example, in connection with everyday online or electronic transactions, which may include financial transactions, establishment of lines of credit, in-store purchases for goods and/or services, or the like.

As devices typically utilized for communicating and/or performing Internet-based electronic transactions, such as smart phones, tablet computing devices, laptop computers, etc., become increasingly sophisticated, techniques for accomplishing fraud utilizing such devices have also become more sophisticated. Techniques for accomplishing fraud may involve use of and/or knowledge of complex technology, for example, which may be related to the particular hardware and/or software platforms associated with such smart phones, tablets, laptop computers, etc. Thus, attempts to reduce the instances of fraud and deception, which may involve, for example, use of various electronic devices, continues to be an active area of investigation.

SUMMARY

One general aspect concerns a method of proving possession of a communications device including receiving, from a client server, an indicator to identify a communication services carrier providing communication services to the communications device, generating a session identifier and a resource locator to be used by the communications device to establish a directed connection with an identity verifier at an address corresponding to the resource locator, the resource locator being determined based, at least in part, on the indicator received from the client server. The method further includes transmitting the session identifier and/or the resource locator to the client server and receiving, from the client server via a the communication services carrier, one or more identifiers of the communications device based, at least in part, on the session identifier and the resource locator, the one or more identifiers to be determined, at least in part, from content stored within, or data derived from, memory of the communications device.

In particular embodiments, the method may additionally include determining the identity of the communications device based, at least in part, on the received one or more identifiers. In particular embodiments, the resource locator corresponds to a uniform resource locator (URL). In particular embodiments, the received one or more identifiers may include a telephone number, an International Mobile Subscriber Identifier (IMSI), an Integrated Circuit Card Identifier (ICC ID), an International Mobile Equipment Identifier (IMEI), a Mobile Station International Subscriber Directory Number (MSISDN), a Media Access Control (MAC) address, or any combination thereof. In particular embodiments, the generated URL may include the session identifier, and, in addition, the generated URL may to be received by the communications device via the client server. In particular embodiments, the session identifier may include a one-time-use token. In particular embodiments, the indicator can include an alphanumeric combination that indicates a specific communication services carrier providing services to the communications device. In particular embodiments, the received indicator may correspond to an Internet protocol (IP) address. In particular embodiments, the method may additionally include the identity verifier accessing a data store to determine a specific communication services carrier providing services to the communications device based, at least in part, on the received IP address. The method may further include receiving, by the identity verifier, the session identifier from the communications device and, responsive to receiving the session identifier, revoking the session identifier. The method may additionally include establishing a browser-based session between the identity verifier and the communications device, which may involve use of at least one additional session identifier. In particular embodiments, the method may include receiving the session identifier from the communications device and revoking the session identifier so as to preclude a further use of the session identifier. In particular embodiments, the method may include generating, via the identity verifier, the at least one additional session identifier and establishing a browser based session with the communications device, based at least in part on the at least one additional session identifier. In particular embodiments, the at least one additional session identifier includes one or more additional one-time-use tokens. In particular embodiments, the memory of the communications device may correspond to one or more memory locations on a subscriber identity module (SIM).

Another general aspect refers to a server having a processor coupled to at least one memory device, the processor coupled to the at least one memory device to receive, from a client server, an indicator to identify a communication services carrier providing communication services to a communications device, to generate a session identifier and a resource locator to be used by the communications device to direct the communications device to an identity verifier at an address to correspond to the resource locator, the resource locator to be generated based, at least in part, on the indicator received from the communications device via the client server, to transmit the session identifier and/or the resource locator to the communications device via the client server, and to receive, from the client server via the communication services carrier, one or more identifiers of the communications device based, at least in part, on the session identifier and the resource locator. The one or more identifiers may be determined, at least in part, from content stored within, or data derived from, memory of the communications device.

In particular embodiments, the one or more identifiers may include a telephone number, an International Mobile Subscriber Identifier (IMSI), an Integrated Circuit Card Identifier (ICC ID), an International Mobile Equipment Identifier (IMEI), a Mobile Station International Subscriber Directory Number (MSISDN), a Media Access Control (MAC) address, or any combination thereof. In particular embodiments, the resource locator corresponds to a uniform resource locator (URL). In particular embodiments, session identifiers may include one or more one-time-use tokens. In particular embodiments, the indicator identifying the communication services carrier includes an alphanumeric combination. In particular embodiments, the indicator identifying the communication services carrier includes an Internet protocol (IP) address. In particular embodiments, the processor and the at least one memory are additionally to access a data store to determine the communication services carrier to provide services to the communications device based, at least in part, on the IP address. In particular embodiments, the processor and the at least one memory of the identity verifier are additionally to receive the session identifier from the communications device and revoke the session identifier so as to preclude a further use of the session identifier. In particular embodiments, the processor and the at least one memory are additionally to generate, via the identity verifier, at least one additional session identifier and establish a browser based session with the communications device, based at least in part on the at least one additional session identifier. In particular embodiments, the at least one additional session identifier includes one or more additional one-time-use tokens.

Another general aspect refers to an article including a non-transitory storage medium having instructions stored thereon executable by a special-purpose computing platform to receive, from a client server, an indicator to identify a communication services carrier providing communication services to a communications device, to generate a session identifier and a resource locator to be used by the communications device to establish communications with an identity verifier at an address to correspond to the resource locator, the resource locator to be generated based, at least in part, on the indicator received from the communications device via the client server, to transmit the session identifier to the communications device via the client server, and to receive, from the client server via the communication services carrier, one or more identifiers of the communications device based, at least in part, on the session identifier and the resource locator, the one or more identifiers to be determined, at least in part, from content stored within, or data derived from, memory of the communications device. In particular embodiments, the article includes instructions to access a data store to determine a communication services carrier providing services to the communications device based, at least in part, on an Internet protocol (IP) address referred to by the indicator. In particular embodiments the generated resource locator includes the session identifier, wherein the resource locator is to be received by the communications device via the client server. In particular embodiments, the article additionally includes instructions to receive from the communications device, via the client server, the session identifier, and to, responsive to receipt of the session identifier, revoke the session identifier so as to preclude further use of the session identifier. In particular embodiments, the article additionally includes instructions to establish a browser-based session with the communications device and to access the data store to determine one or more deterministic events with respect to the communications device.

Another general aspect refers to a communications device, comprising at least one processor coupled to at least one memory device to receive a resource locator from an identity verifier, the resource locator to have been generated by the identity verifier and to include a session identifier, and, in response to receipt of the resource locator, establish communications with a computing device at a logical location corresponding to the resource locator under direction of the identity verifier. The processor coupled to the at least one memory may be additionally to establish a browser session with the identity verifier and to transmit one or more identifiers to be determined, at least in part, from content stored within, or data derived from, memory of the communications device, to the identity verifier in response to one or more queries from the identity verifier.

In particular embodiments, the resource locator corresponds to a uniform resource locator (URL). in particular embodiments, the received session identifier is generated responsive to receipt of an indicator to identify a communication services carrier providing communication services with the communications device. In particular embodiments, the indicator corresponds to an Internet protocol (IP) address. In particular embodiments, the indicator corresponds to an alphanumeric combination to indicate a particular communication services carrier providing services to the communications device.

BRIEF DESCRIPTION OF THE DRAWINGS

Claimed subject matter is particularly pointed out and distinctly claimed in the concluding portion of the specification. However, both as to organization and/or method of operation, features, and/or advantages thereof, it may best be understood by reference to the following detailed description if read with the accompanying drawings in which:

Figure 1:
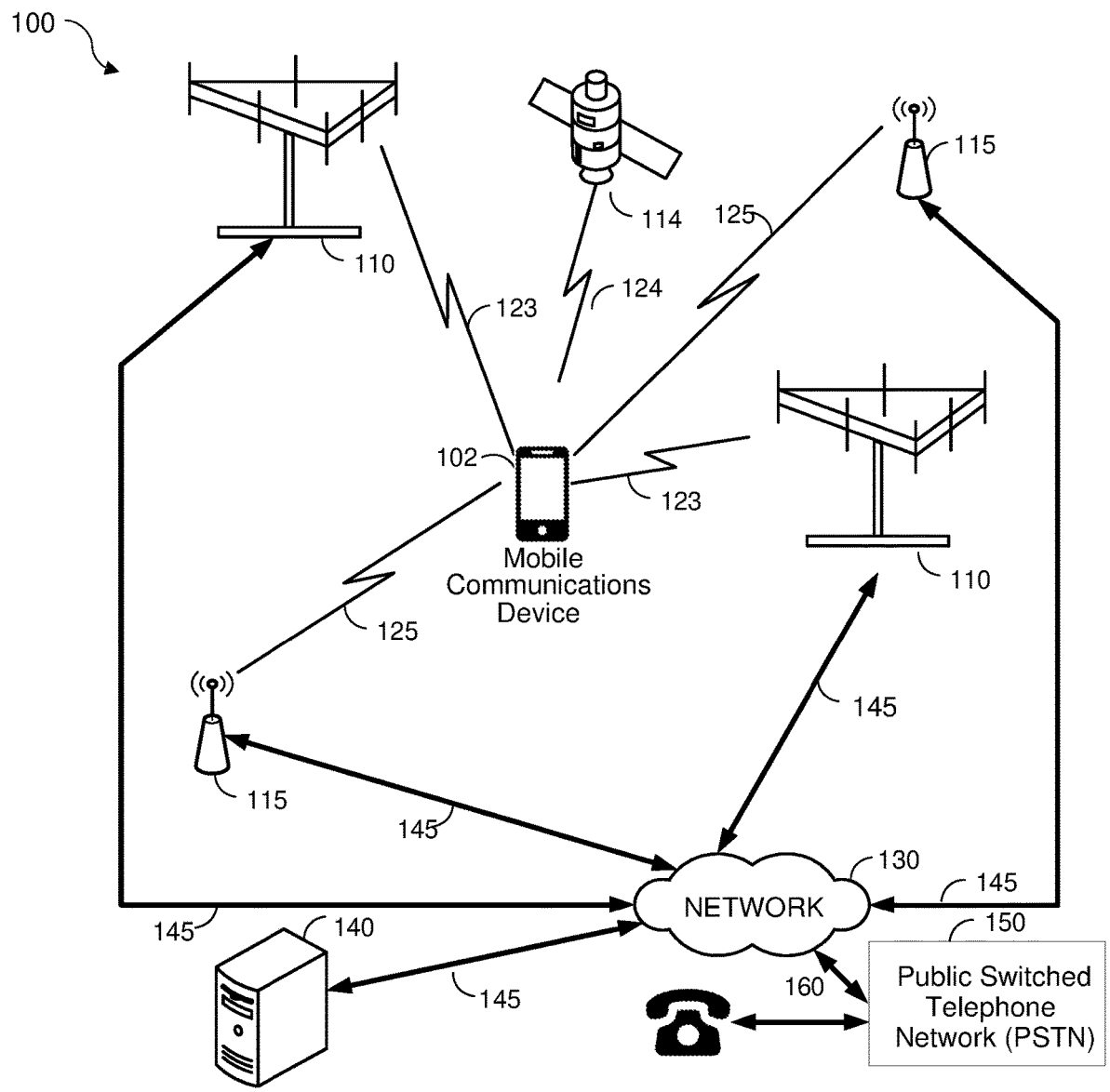
FIG. 1 is a diagram of a telecommunications infrastructure, according to various embodiments.

Reference is made in the following detailed description to the accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others, one or more aspects, properties, etc. may be omitted, such as for ease of discussion, or the like. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification, are not necessarily intended to refer to the same implementation and/or embodiment or to any one particular implementation and/or embodiment. Furthermore, it is to be understood that particular features, structures, characteristics, and/or the like described, are capable of being combined in various ways in one or more implementations and/or embodiments and, therefore, are within intended claim scope. In general, of course, for the specification of a patent application, these and other issues have a potential to vary in a particular context of usage. In other words, throughout the disclosure, particular context of description and/or usage provides guidance regarding reasonable inferences to be drawn; however, likewise, the term "in this context" in general without further qualification refers at least to the context of the present patent application.

As previously alluded to, in an environment in which electronic communication devices, such as mobile cellular communications devices, voice over Internet protocol (VoIP) communications devices, etc., are ubiquitous, a user of an electronic communications device may wish to perform an electronic or digital transaction. Such transactions may involve completing an application for credit, engaging in an electronic financial transaction, purchasing a product and/or service, completing of a loan application, completing of one or more forms involved with applying for healthcare coverage (such as in connection with visiting a health provider's office), and/or engaging in a number of other types of transactions via an electronic communications device (or, more simply, a "communications device"). To facilitate these types of transactions, for example, a subscriber collocated with a communications device may establish an identity, such as may be established in connection with a communications device subscriber account with a cellular or mobile communications device services carrier, a VoIP services provider, or other type of communication services carrier. Establishment of an account associated with a communications device, utilizing, for example, a subscriber account identifier (e.g., a cellular telephone number), may permit an individual attempting to engage in an electronic or digital transaction to be authenticated, authorized, and/or verified. In some instances, in view of the nature of electronic or digital transactions, such as in an environment in which electronic or digital transactions are initiated via a communications network at any time and at any location, it may be useful to verify and/or authenticate a user relatively quickly, such as in a real-time fashion, for example.

As a general matter, verification of possession of a communications device by a transacting party such as a party proximate or collocated with a communications device, may be desirable in response to a client institution or organization (e.g., a financial institution, a brokerage, a healthcare provider, etc.) seeking to determine and/or prove identity of the transacting party (e.g., a mobile subscriber). Proving possession of a communications device, such as with a transacting party, may involve establishing a correspondence between the transacting party and a subscriber account identifier. In this context, correspondence, association, and/or similar terms refer to a persistent, continuing, and objectively verifiable relationship between the transacting party in possession of, for example, a particular communications device, such as a mobile communications device. Thus, a unique subscriber account identifier may be employed to signify and/or identify a particular transacting party. In this context, the term "mobile communications device identity" and/or similar terms refer to an identity that leverages a mobile communications device account relationship (also referred to as a correspondence and/or association) of a subscriber as a source of authentication, authorization, and/or verification of a transacting party. Also in this context, the term "mobile subscriber device account" and/or similar terms refer to a mobile communication services provider account. The terms "mobile communications device services provider," "mobile communications device carrier," and "mobile network operator" may be used interchangeably. Furthermore, in this context, the term "mobile device services carrier," "telecommunication services carrier," "services carrier," or simply "carrier" may refer to an entity of a communications infrastructure that provides wired and/or wireless communication services to the general public for a consideration, such as a monthly subscription fee.

In the context of the present disclosure, a "communication services carrier" may refer to a mobile communication services provider and/or mobile network operator. However, there are examples of carriers that do not correspond to mobile communications device services providers and/or mobile network operators. Such instances may include wireline services providers (for example, providers of services operating within the public switched telephone network or PSTN), which include wireline services for rotary dial telephones and/or telephones utilizing, for example, dual tone multi-frequency (DTMF) signaling. Accordingly, the terms "services carrier" or simply "carrier" may be used in place of a communication services provider and/or wireline telephone services provider without a loss in meaning and/or understanding. In a given situation, particular context of usage should indicate if a term is being used in a general sense or in a narrower sense, such as referring to a mobile communications device services provider, wireline services provider, mobile paging services provider, and/or mobile network operator, for example.

Other aspects of verifying and/or authenticating a mobile subscriber, such as by way of proving that a mobile subscriber is in possession of a communications device, are also described in greater detail hereinbelow. For example, in an embodiment, verifying the identity of and/or authenticating a transacting party may relate to a mobile account and/or a mobile subscriber. Further, a mobile subscriber account is one example of a type of subscriber account, especially in a networked electronic commerce environment, although claimed subject matter is not intended to be limited to online accounts or to mobile accounts. Rather, the term "account" or "subscriber account" in this context refers to a formal business arrangement between an entity, a person, or other party seeking to engage in a transaction, and a provider of the account, so as to accomplish a business purpose, for example. Thus, the term "account" is intended to be broadly interpreted as an arrangement that may provide certain privileges. In this context, privileges may involve access to credit, so as to facilitate the purchase of goods or services, access to privileged content, such as premium entertainment content (e.g., premium sports, cinema, or other entertainment content). Also in this context, the term "privileged content" is intended to be interpreted broadly so as to encompass any type of content available exclusively to certain individuals and/or certain entities in response to supplying certain credentials. Also in this context the term "parameters" refers numerical or other measurable factors capable of defining a system and/or to set conditions for operation of a system. Thus, for example, a set of parameters may include parameters stored via a non-transitory memory that forms or defines, at least in part, an electronic representation of the state of a mobile subscriber.

Likewise, an account may comprise various attributes. In this context, the term "subscriber account identifier" refers to a unique descriptor or feature associated with the account that defines certain aspects of the account. For example, in nonlimiting illustrations, a subscriber account identifier may refer to (or may at least be associated with) a mobile telephone number, a mobile subscriber unique alias, an international mobile subscriber identifier (IMSI), Integrated Circuit Card Identifier (ICC ID), a mobile services and/or other type of identifier (e.g., a unique identifier) employed in connection with the particular mobile network operator or the mobile communication services provider. Mobile communications networks may include those compatible or compliant with a Global System for Mobile Communications (GSM) telecommunications network, for example. Other examples of mobile subscriber account identifiers may include an International Mobile Equipment Identifier (IMEI), Mobile Station International Subscriber Directory Number (MSISDN), a mobile equipment identifier or any other identifier that may be utilized to identify a mobile billing account number/identifier.

As discussed herein, a subscriber collocated with, or in possession of, a communications device may apply for an account, such as a credit account, for example, or may apply for any other type of account that imparts or confers particular privileges on the subscriber collocated or in possession of the communications device. In other instances, a subscriber collocated with a mobile device may attempt to engage in a financial transaction, for example, or may attempt to access privileged information/privileged content, just to name a few examples. In many instances, to obtain privilege, such as access to credit, access to privileged information (e.g., premium content streaming or other entertainment) a mobile subscriber may be required to complete an application, such as an application for an account, an application for credit, an application for an increase in credit, or may be required to make another type of formal request, which involves the subscriber supplying subscriber-specific parameters. However, as previously alluded to, it may be advantageous for the subscriber, and for the institution providing privileges to the subscriber, for example, to verify or prove that, indeed, the subscriber is collocated with (or is in possession of) a particular communications device. By proving possession of a particular communications device, an institution may reduce the risk of a subscriber engaging in fraudulent behavior by impersonating a particular mobile subscriber and/or by obtaining another subscriber's mobile phone, such as by theft or by any other type of unscrupulous behavior.

Thus, in particular embodiments, proving possession of a communications device may reduce the likelihood of an unscrupulous individual completing a fraudulent financial transaction, such as transactions involving credit applications, increases in credit lines, purchases, asset sales, access to premium content, or the obtaining of any other type of privileges via fraud and/or deception. In particular embodiments, proving possession of a communications device may involve initiating a browser session via the communications device, in which the device is directed to connect or establish contact with an identity verifier via a resource locator, such as a uniform resource locator (URL). During such a browser session, which may be initiated by a subscriber in possession of or collocated with a particular communications device, an application program, executing by way of a processor coupled to at least one memory of the communications device, may obtain or derive specific communications device parameters directly, and without user input, from memory elements within the device. Communications device parameters may comprise those accessed from a subscriber identity module (SIM), or from any other memory or parameter storage location accessible by a processor of the communications device. In some instances, by way of obtaining parameters stored in a SIM of the communications device, for example, under the direction of a browser program operating on the device, an identity verifier can be assured that the subscriber operating the communications device is, indeed, in possession of the particular communications device.

Responsive to an identity verifier having proved that an assumed or purported subscriber is, indeed, in possession of a particular communications device, a financial institution, for example, may be confident that a verified and/or authenticated individual is attempting to engage in a transaction. Conversely, in response to an identity verifier determining that an assumed or purported subscriber is likely not in possession of a particular communications device (or cannot be proven to be in possession of a particular communications device), a financial institution, for example, may elect to terminate a financial transaction, for example.

Further, an identity verifier may utilize parameters obtained from a specific communications device to access one or more records relating to historical events with respect to the particular communications device. In particular embodiments, records relating to historical events relative to the particular communications device may be indicative of the reputation of the communications device. Thus, responsive to an identity verifier obtaining records relating to historical events relevant to the particular communications device, the identity verifier may report a measure of trust or trustworthiness with respect to a particular communications device. In some instances, a financial institution, for example, may utilize measures of trust or trustworthiness of a particular communications device to influence whether particular transactions should be permitted to take place. For example, responsive to an identity verifier reporting a relatively low measure of trust or trustworthiness of a communications device, a financial institution may permit only low-value transactions (e.g., less than $100) to take place. In another example, responsive to an identity verifier reporting a relatively high measure of trust or trustworthiness of a particular communications device, a financial institution may permit transactions of virtually any value to take place.

Thus, particular embodiments of claimed subject matter may allow a financial institution to be assured that an unscrupulous individual, who might be impersonating the owner of the particular communications device, for example, cannot complete a financial transaction. In many instances, precluding unscrupulous individuals from engaging in fraudulent financial transactions, such as by way of the fraudulent impersonation of a particular communications device account holder, operates to protect authentic account holders as well as financial institutions, content providers, healthcare institutions, and so forth. In addition, following an identity verifier verifying and/or authenticating a particular subscriber, such as by way of determining that the subscriber is in possession of a specific communications device, particular embodiments of claimed subject matter may permit an identity verifier to report to a financial institution, for example, a measure of trust and/or trustworthiness of a particular communications device. By way of reporting trust and/or trustworthiness to a financial institution, certain types of transactions may be permitted to occur while other types of transactions may be disallowed. Preventing fraudulent transactions may bring about a reduction in instances of identity theft, fraud related to credit cards and/or other instruments, circumventing of parental controls, pirating of exclusive entertainment content, and so forth.

In particular embodiments, a method of proving possession of a communications device may proceed in response to a subscriber (purportedly or assumed to be in possession of the communications device) contacting a client server or other type of processing resource under the control and/or the direction of, for example, an institution (e.g., a financial institution, a healthcare provider, a content provider, etc.). Such contact may, at least in certain embodiments, be in response to a subscriber attempting to initiate a financial transaction, initiate accessing of privileged content, etc. In particular embodiments, the client server, perhaps operating in accordance with the business rules and/or business logic implemented by the institution may facilitate and/or support identity verification and/or authentication prior to permitting certain types of transactions to occur. Accordingly, in response to the subscriber contacting the institution, the client server may communicate with an identity verifier, who may operate to prove that a particular subscriber is, indeed, in possession of a certain mobile communications device. Such proof may enable the identity verifier to verify, authorize, and/or audit the identity of the subscriber. As a part of a process to authenticate, verify, and/or authorize a transaction involving the subscriber, the client server of the institution may participate in directing the communications device in the possession of the subscriber to establish a connection, such as via the Internet, with a website, for example, under the control of an identity verifier. In turn, the identity verifier may initiate a browser session directly with the communications device of the subscriber so as to facilitate session-based communications between the identity verifier and the communications device. Following establishment of a browser session between the identity verifier and the communications device, the identity verifier may direct the communications device to obtain, for example, hardware parameters stored at memory locations within the communications device. In an embodiment, in response to receiving one or more queries from the identity verifier, the communications device may access a SIM (or other memory device) of the communications device to determine or obtain specific device parameters. The specific device parameters may be encoded and forwarded to the identity verifier. The identity verifier may utilize such device-specific parameters determined or obtained from the communications device so as to permit comparison of the device parameters with corresponding parameters stored in a data store accessible to the identity verifier. Responsive to agreement or a match between parameters from the communications device and parameters obtained from the data store, the identity verifier may prove the identity of and/or authenticate the subscriber operating the particular communications device.

As previously noted, in particular embodiments, after verification of the identity of a particular communication services subscriber, an identity verifier may access a data store to determine a reputation with respect to a communications device. In particular embodiments, a reputation with respect to a communications device may be negatively impacted (e.g., degraded) responsive to the communications device being associated with one or more risk events. Such risk events may include, but are not limited to, recent porting of a subscriber account identifier (e.g., a telephone number) associated with a communications device, recent replacement of a communications device, a recent request of a one-time-password associated with a communications device, removal/replacement of a SIM of a communications device, as well as any number of additional risk events associated with the device. In particular embodiments, a reputation of a communications device may be positively impacted (e.g., enhanced) responsive to the device having never been ported (or having not been ported for a prolonged period of time), having never undergone removal/replacement of a SIM (or having not undergone such removal/replacement of a SIM for a prolonged period of time), and so forth. It should be noted that claimed subject matter is intended to embrace risk events with respect to a communications device other than these, virtually without limitation.

In particular embodiments, a communications device subscriber seeking to engage in a financial transaction, for example, may access a financial institution, via a wireless connection between a communications device collocated with the subscriber, and a client server, for example, under the control and/or direction of the financial institution. Following establishment of a communications link between the communications device and the client server, the device may transmit an indicator, such as an Internet protocol (IP) address, or, for example, an alphanumeric combination, that identifies a communication services carrier providing communication services to the device. In turn, the client server may convey the indicator received from the communications device to an identity verifier. Responsive to receipt of the indicator indicating a communication services carrier providing communication services to the device, and based, at least in part, on the content of the received indicator, the identity verifier may formulate and/or generate a session identifier, which may comprise a one-time-use token. The session identifier may be transmitted to the communications device via the client server. In particular embodiments, the formulation and/or generation of a session identifier may be tailored to particular IP addresses, or ranges of IP addresses, which may be indicative of a particular carrier providing services to the communications device. In certain other embodiments, formulation and/or generation of a session identifier may be tailored in accordance with a particular service carrier as indicated by an alphanumeric combination (e.g., "XYZ" wireless services).

In particular embodiments, a session identifier may be arranged or positioned within a resource locator, such as a URL, which may be transmitted to a communications device. Following receipt of the session identifier by the communications device, the device may be directed or pointed to a location corresponding to the identity verifier. The identity verifier may then revoke the session identifier so as to ensure that the session identifier cannot be reused, such as by a fraudulent actor who may attempt operate another communications device. Upon revoking the session identifier, the identity verifier may initiate a browser session with the communications device, which may involve generation of at least one additional session identifier comprising one or more one-time-use tokens. During a browser session, an identify verifier may transmit one or more an additional session identifier comprising one or more additional one-time-use tokens to a communications device. While a browser session is in progress, and under the direction of, for example, an application program interface (API), the communications device may access or determine one or more stored parameters from a SIM (or other memory location) internal to the communications device. Alternatively, or in addition to, an API may derive communications device-specific from memory devices within, or under the control of, the communications device.

Such parameters may then be transmitted to the identity verifier during the browser session. In particular embodiments, by way of an identity verifier receiving one or more stored parameters from a SIM of the communications device, the identity verifier can have relatively high confidence, or actual proof, that the subscriber is, indeed, in possession of a particular communications device. Accordingly, the identity verifier can be assured that a trustworthy, verified, and/or authenticated account holder is attempting to engage in a transaction, such as a financial transaction, rather than an unscrupulous individual attempting to engage in a fraudulent transaction. Following transmission of one or more stored parameters from a SIM of the communications device, and following verification and/or authentication, the communications device may be directed back to the client server of the financial institution.

Although the discussion that follows relates to any type of account, in nonlimiting illustrations, accounts corresponding to communications devices may be used for illustration. However, it is understood that claimed subject matter is intended to not be limited to examples provided primarily for purposes of illustration, since such examples may be oversimplified for purposes of comprehension, for example.

As previously alluded to, in particular instances, a mobile subscriber may attempt to access a bank account via a voice call, a web browser, or by utilizing a computer process executing by way of a processor coupled to at least one memory of a communications device, for example, which may permit the mobile subscriber to engage in a financial transaction. Hence, a bank, lender, brokerage firm, or any other type of financial institution, in response to an attempt to access the bank account, may employ an application programming interface (API) substantially compatible and/or substantially compliant with HTTP and/or HTTPS, including versions now known and/or to be later developed, and/or another suitable protocol (e.g., now known and/or to later be developed). In such examples, a user may seek to take one or more actions with respect to an account, such as, for example, establishing an account, updating a credit value (e.g., credit limit) for an account, transferring funds, viewing a history of electronic or digital transactions, updating privileged content and/or parameters, etc.

In FIG. 1 (embodiment 100) communications device 102 may transmit radio signals to, and receive radio signals from, a wireless communications network. In an example, communications device 102 may communicate with a cellular communications network by transmitting wireless signals to, and/or receiving wireless signals from, a cellular transceiver 110, which may comprise a wireless base transceiver subsystem (BTS), a Node B or an evolved NodeB (eNodeB), over wireless communication link 123. Similarly, communications device 102 may transmit wireless signals to, and/or receive wireless signals from, local transceiver 115 over wireless communication link 125. A local transceiver 115 may comprise an access point (AP), femtocell, Home Base Station, small cell base station, Home Node B (HNB) or Home eNodeB (HeNB) and may provide access to a wireless local area network (WLAN, e.g., IEEE 802.11 network), a wireless personal area network (WPAN, e.g., Bluetooth® network) or a cellular network (e.g. an LTE network or other wireless wide area network, such as those discussed herein). Of course, it should be understood that these are merely examples of networks that may communicate with a mobile device over a wireless link, and claimed subject matter is not limited in this respect. In particular embodiments, cellular transceiver 110, local transceiver 115, satellite 114, and PSTN 150 represent touchpoints, which permit communications device 102 to interact with network 130.

Examples of network technologies that may support wireless communication link 123 are GSM, Code Division Multiple Access (CDMA), Wideband CDMA (WCDMA), Long Term Evolution LTE), High Rate Packet Data (HRPD). GSM, WCDMA and LTE are technologies defined by 3GPP. CDMA and HRPD are technologies defined by the $3^{rd}$ Generation Partnership Project 2 (3GPP2). WCDMA is also part of the Universal Mobile Telecommunications System (UMTS) and may be supported by an HNB. Cellular transceivers 110 may comprise deployments of equipment providing subscriber access to a wireless telecommunication network for a service (e.g., under a service contract). In the embodiment of FIG. 1, a cellular transceiver 110 may perform functions of a cellular base station in servicing subscriber devices within a cell determined based, at least in part, on a range at which the cellular transceiver 110 is capable of providing access service. Examples of radio technologies that may support wireless communication link 125 are IEEE 802.11, BT and LTE.

In a particular implementation, cellular transceiver 110 and local transceiver 115 may communicate with server 140, such as by way of network 130 via communication links 145. Here, network 130 may comprise any combination of wired or wireless links and may include cellular transceiver 110 and/or local transceiver 115 and/or server 140. In a particular implementation, network 130 may comprise Internet Protocol (IP) or other infrastructure capable of facilitating communication between communications device 102 at a call source and server 140 through local transceiver 115 or cellular transceiver 110. In an embodiment, network 130 may also facilitate communication between communications device 102, server 140 and a PSTN 150, for example through communications link 160. In another implementation, network 130 may comprise a cellular communication network infrastructure such as, for example, a base station controller or packet based or circuit based switching center (not shown) to facilitate mobile cellular communication with communications device 102. In a particular implementation, network 130 may comprise local area network (LAN) elements such as WiFi APs, routers and bridges and may, in such an instance, comprise links to gateway elements that provide access to wide area networks such as the Internet. In other implementations, network 130 may comprise a LAN and may or may not involve access to a wide area network but may not provide any such access (if supported) to communications device 102. In some implementations, network 130 may comprise multiple networks (e.g., one or more wireless networks and/or the Internet). In one implementation, network 130 may include one or more serving gateways or Packet Data Network gateways. In addition, one or more of server 140 may comprise an E-SMLC, a Secure User Plane Location (SUPL) Location Platform (SLP), a SUPL Location Center (SLC), a SUPL Positioning Center (SPC), a Position Determining Entity (PDE) and/or a gateway mobile location center (GMLC), each of which may connect to one or more location retrieval functions (LRFs) and/or mobility management entities (MMEs) of network 130.

In particular embodiments, communications between communications device 102 and cellular transmitter 110, satellite 114, local transceiver 115, and so forth may occur utilizing signals communicated across wireless communications channels. Accordingly, the term "signal" may refer to communications utilizing propagation of electromagnetic waves across wireless communications channels. Signals may be modulated to convey messages utilizing one or more techniques such as amplitude modulation, frequency modulation, binary phase shift keying (BPSK), quaternary phase shift keying (QPSK) along with numerous other modulation techniques, and claimed subject matter is not limited in this respect. Accordingly, as used herein, the term "messages" refers to parameters, such as binary signal states, which may be encoded in a signal using one or more of the above-identified modulation techniques.

In particular implementations, and as discussed below, communications device 102 may comprise circuitry and processing resources capable of obtaining location related measurements (e.g. for signals received from GPS or other Satellite Positioning System (SPS) satellites 114), cellular transceiver 110 or local transceiver 115 and possibly computing a position fix or estimated location of communications device 102 based on these location related measurements. In some implementations, location related measurements obtained by communications device 102 may be transferred to a location server such as an enhanced serving mobile location center (E-SMLC) or SUPL location platform (SLP) (e.g. which may comprise a server, such as server 140) after which the location server may estimate or determine an estimated location for communications device 102 based on the measurements. In the presently illustrated example, location related measurements obtained by communications device 102 may include measurements of signals (124) received from satellites belonging to an SPS or Global Navigation Satellite System (GNSS) such as GPS, GLONASS, Galileo or Beidou and/or may include measurements of signals (such as 123 and/or 125) received from terrestrial transmitters fixed at known locations (e.g., such as cellular transceiver 110).

Communications device 102 or a separate location server may obtain a location estimate for communications device 102 based on location related measurements using any one of several position methods such as, for example, GNSS, Assisted GNSS (A-GNSS), Advanced Forward Link Trilateration (AFLT), Observed Time Difference Of Arrival (OTDOA) or Enhanced Cell ID (E-CID) or combinations thereof. In some of these techniques (e.g. A-GNSS, AFLT and OTDOA), pseudoranges or timing differences may be measured at communications device 102 relative to three or more terrestrial transmitters fixed at known locations or relative to four or more satellites with accurately known orbital data, or combinations thereof, based at least in part, on pilots, positioning reference signals (PRS) or other positioning related signals transmitted by the transmitters or satellites and received at communications device 102. Here, server 140 may be capable of providing positioning assistance data to communications device 102 including, for example, information regarding signals to be measured (e.g., signal timing), locations and identities of terrestrial transmitters and/or signal, timing and orbital information for GNSS satellites to facilitate positioning techniques such as A-GNSS, AFLT, OTDOA and E-CID. For example, server 140 may comprise an almanac to indicate locations and identities of cellular transceivers and/or local transceivers in a particular region or regions such as a particular venue, and may provide information descriptive of signals transmitted by a cellular base station or AP such as transmission power and signal timing. In the case of E-CID, communications device 102 may obtain measurements of signal strengths for signals received from cellular transceiver 110 and/or local transceiver 115 and/or may obtain a round trip signal propagation time (RTT) between communications device 102 and a cellular transceiver 110 or local transceiver 115. A communications device 102 may use these measurements together with assistance data (e.g. terrestrial almanac data or GNSS satellite data such as GNSS Almanac and/or GNSS Ephemeris information) received from server 140 to determine a location estimate for communications device 102 or may transfer the measurements to server 140 to perform the same determination. A call from communications device 102 may be routed, based on the location of communications device 102, and connected to PSTN 150, for example, via wireless communication link 123 and communications link 160.

A mobile device at a call source (e.g., communications device 102 of FIG. 1) may be referred to by any name corresponding to a cellphone, smartphone, laptop, tablet, PDA, tracking device or some other portable or movable device. Typically, though not necessarily, a mobile device may support wireless communication such as using GSM, WCDMA, LTE, CDMA, HRPD, WiFi, BT, WiMax, etc. A mobile device may also support wireless communication using a wireless LAN (WLAN), DSL or packet cable for example. A mobile device may comprise a single entity or may comprise multiple entities such as in a personal area network where a user may employ audio, video and/or data I/O devices and/or body sensors and a separate wireline or wireless modem. An estimate of a location of a mobile device (e.g., communications device 102) may be referred to as a location, location estimate, location fix, fix, position, position estimate or position fix, and may be geographic, thus providing location coordinates for the mobile device (e.g., latitude and longitude) which may or may not include an altitude component (e.g., height above sea level, height above or depth below ground level, floor level or basement level).

The architecture of the cellular communications network described in relation to FIG. 1 may comprise a generic architecture that is capable of accommodating a variety of outdoor and indoor location solutions including the standard SUPL user plane location solution defined by the Open Mobile Alliance (OMA) and standard control plane location solutions defined by 3GPP and 3GPP2. For example, server 140 may function as (i) a SUPL location platform to support the SUPL location solution, (ii) an E-SMLC to support the 3GPP control plane location solution with LTE access on wireless communication link 123 or 125, or (iii) a Standalone Serving Mobile Location Center (SAS) to support the 3GPP Control Plane Location solution for UMTS.

Figure 2:
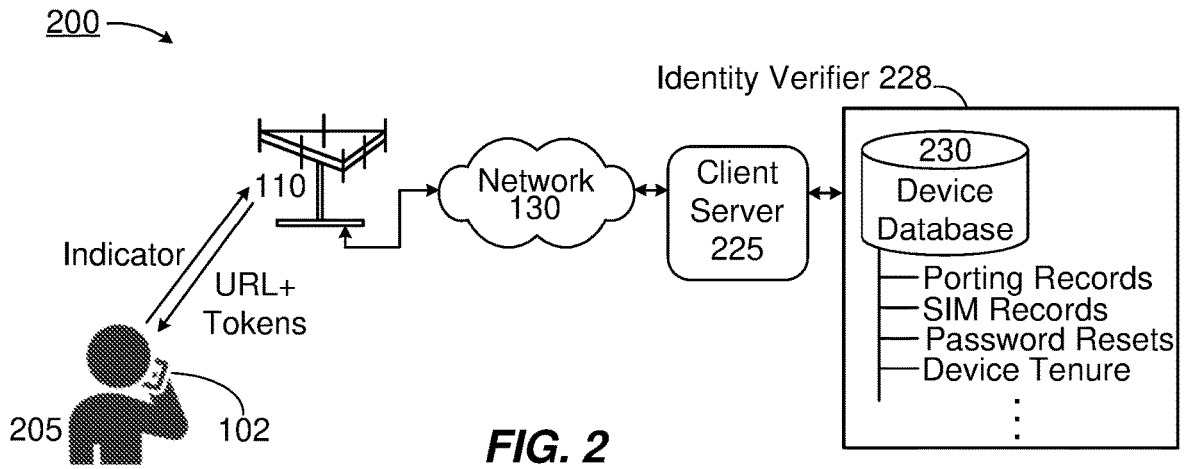
FIG. 2 shows a subscriber in possession of a communications device to permit interaction with a client server and an identity verifier, according to an embodiment.

In view of the communications infrastructure shown and described in reference to FIG. 1, more particular embodiments directed toward reducing the risk of fraud and deception involving a subscriber account identifier that corresponds to the subscriber's communications device are discussed hereinbelow. Thus, FIG. 2 shows a subscriber in possession of a communications device to permit interaction with a client server and an identity verifier, according to an embodiment 200. In the embodiment of FIG. 2, mobile subscriber 205 may be located at any point within communications range of cellular transceiver 110. As shown in FIG. 2, communications device 102 may communicate with client server 225 via network 130 wirelessly coupled to cellular transceiver 110. It should be noted, however, that claimed subject matter is not limited exclusively to wireless communications between device 102 and cellular transceiver 110. For example, in particular embodiments, communications device 102 may communicate with client server 225 by way of one or more intervening Wi-Fi or wireline telephone services (e.g., the public switched telephone network).

Subscriber 205 may attempt to engage in a financial transaction via client server 225, which may signify a bank (or other type of financial institution), a healthcare provider, a content provider, or any other type of entity that may, at least from time to time, require verification, authentication, and/or auditing of subscriber 205 prior to permitting a transaction to take place. Accordingly, subscriber 205 may initiate a transaction involving client server 225 utilizing, for example, communications device 102. In the embodiment of FIG. 2, subscriber 205 may establish a browser session, such as a browser session utilizing a mobile Internet service provider, with client server 225. During such a browser session, communications device 102 may transmit, convey, or otherwise signal an intent to engage in a transaction, such as a financial transaction, via client server 225. Alternatively, in particular embodiments, communications device 102 may signal an intent to engage in a transaction outside of a browser session, such as by pushing one or more messages (e.g., via short messaging system or SMS messages) to client server 225, without client server 225 initiating one or more requests to be answered by communications device 102.

Responsive to client server 225 receiving, for example, a transmission signaling an intent of subscriber 205 to initiate a transaction, client server 225 may communicate with identity verifier 228. Identity verifier 228 may operate to verify, authenticate, and/or audit subscriber 205 so as to determine a reputation of communications device. Thus, identity verifier may utilize parameters obtained from communications device 102 to access one or more records relating to historical events relevant to device 102. Accordingly, identity verifier 228 may access device database 230 to obtain account information comprising the name, address, phone number, and other parameters of subscriber 205. Identity verifier 228 may additionally obtain historical records of deterministic events with respect to communications device 102. In some embodiments, identity verifier 228 may access device database 230 so as to permit computing a trustworthiness score or other measure of trustworthiness, with respect to communications device 102. A trustworthiness score or trustworthiness measure may be based, at least in part, on historical records relating to instances of reassignment or porting of subscriber account identifiers (e.g., a telephone number) from a first communication services carrier to a second communication services carrier. A trustworthiness score or trustworthiness measure may be based, at least in part, on tenure of communications device 102, which may relate to a period of time subscriber 205 has owned, leased, or utilized services of a carrier to provide communication services to device 102. A trustworthiness score or trustworthiness measure may be based, at least in part, on whether device 102 has undergone a SIM removal/replacement. A trustworthiness score or trustworthiness measure may be based, at least in part, on whether device 102 has undergone a password or personal identification number reset, such as via a one-time password, for example. It should be noted that claimed subject matter is intended to embrace additional contributors to a trustworthiness score or trustworthiness measure, virtually without limitation.

As shown in FIG. 2, communications device 102 may transmit an indicator to client server 225, which may operate to identify a communication services carrier providing services to device 102. Responsive to receipt of an indicator from communications device 102, client server 225 may determine that communications device 102 is associated with a particular communication services carrier. In particular embodiments, communications device 102 may transmit an IP address, such as an IPv4 address, IPv6 address, a media access control (MAC) address, or any other type of indicator that identifies a logical address of communications device 102. Responsive to receiving an indicator from communications device 102, client server 225 may forward the indicator to identity verifier 228. Following receipt of the indicator from client server 225, identity verifier 228 may utilize the indicator to generate a resource locator, which may be tailored to the logical location of communications device 102. For example, responsive to an indicator from communications device 102 indicating an IP address within a particular range of IP addresses, identity verifier 228 may determine that device 102 is currently operating on a cellular communications network corresponding to carrier "A." Hence, identity verifier 228 may generate a tailored session identifier for transmission to communications device 102. In another example, responsive to an indicator from device 102 indicating an IP address within a different range of IP addresses, identity verifier 102 may determine that device 102 is currently operating on a cellular communications network corresponding to carrier "B." Identity verifier 228 may thus generate a differently-tailored session identifier for transmission to communications device 102. In some instances, such variations in the tailoring of a session identifier may involve placement of certain fields and/or parameters within a resource locator, such as a URL, transmitted to communications device 102. In other instances, such variations in session identifiers may involve types of fields, number of characters in a field, types of characters in a field, or may include any other variations in tailored session identifiers, and claimed subject matter is not limited in this respect.

In another embodiment, an indicator transmitted from communications device 102 to client server 225 may comprise, for example, an alphanumeric combination, which may directly indicate a particular communication services carrier. Responsive to receipt of an alphanumeric combination, identity verifier 228 may determine that device 102 is currently operating on a cellular communications network corresponding to carrier "XYZ," for example. Identity verifier 228 may thus prepare a tailored session identifier for transmission to communications device 102. For example, responsive to receipt of an alphanumeric combination indicating that device 102 is currently operating on a cellular communications network corresponding to carrier "ABC," identity verifier 228 may prepare a tailored session identifier for transmission to communications device 102. In another example, responsive to receipt of an alphanumeric combination from device 102, indicating that device 102 is currently operating on a cellular communications network corresponding to carrier "XYZ," identity verifier 228 may prepare a differently-tailored session identifier for transmission to communications device 102. Similar to that described above, in some instances, such variations in formulation of a session identifier may involve positioning of certain fields and/or parameters within a resource locator, such as a URL, transmitted to communications device 102. In other instances, such variations in formulation of a session identifier may involve the types of fields, number of characters in a field, types of characters in a field, or may include any other variations in generation of a session identifier, and claimed subject matter is not limited in this respect.

Responsive to receipt of a session identifier from identity verifier 228, which may be forwarded to communications device 102, by way of client server 225, network 130, and cellular transceiver 110, device 102 may be directed to a website under the control of identity verifier 228. Hence, communications device 102 may initiate a web browser, for example, utilizing a resource locator comprising the session identifier received from identity verifier 228. Following establishment of a connection, such as a mobile wireless Internet connection, between communications device 102 and identity verifier 228, the identity verifier may revoke the session identifier so as to preclude further use of the identifier. It may be appreciated that such revocation of the session identifier may prevent an unscrupulous individual from attempting to reuse a previously issued session identifier for the purposes of engaging in a fraudulent transaction utilizing identity verifier 228. In particular embodiments, in response to receipt of a previously revoked session identifier, identity verifier 228 may immediately recognize the occurrence of a potentially fraudulent transaction, which may result in identity verifier 228 refraining from further communication with a communications device.

In the embodiment of FIG. 2, following revocation of the session identifier conveyed from identity verifier 228 to communications device 102 (via client server 225, network 130, and cellular transceiver 110) identity verifier 228 may initiate a browser based communication session directly with communications device 102. Identity verifier 228 may transmit an additional session identifier, which may comprise one or more one-time-use tokens, to communications device 102. Identity verifier 228 may then, at least temporarily, suspend interaction with client server 225. During a browser session, identity verifier 228 may direct communications device 102 to access or determine the contents of one or more memory locations internal to communications device 102 and transmit one or more device-specific identifiers. In an embodiment, device-specific identifiers may be unique to a particular communications device 102, such as comprising, an International Mobile Subscriber Identifier (IMSI), an International Mobile Electronic Identifier (IMEI), or a Mobile Station International Subscriber Directory Number (MSISDN), an Integrated Circuit Card Identifier (ICC ID), or any combination thereof.

Following receipt of one or more identifiers accessed from locations internal to communications device 102, identity verifier 228 may compare received identifiers with one or more stored identifiers by way of accessing device database 230. In response to determining that device-specific parameters obtained from communications device 102 match corresponding parameters stored in device database 230, identity verifier 228 may verify and/or authenticate subscriber 205 collocated with communications device 102. Conversely, in response to determining that device-specific parameters obtained from communications device 102 do not match corresponding parameters stored in device database 230, identity verifier 228 may determine that subscriber 205 cannot be verified and/or authenticated. Identity verifier 228 may additionally indicate that a particular transaction, such as a transaction recently initiated utilizing communications device 102, may be fraudulent.

Following identity verifier 228 successfully verifying the identity of subscriber 205, or, in contrast, following identity verifier 228 unsuccessfully verifying the identity of subscriber 205, identity verifier 228 may instruct communications device 102 to reestablish contact with client server 225. In turn, communications device 102 may reestablish contact with client server 225 and provide a second unique identifier, such as an additional session identifier, to client server 225. In response to communications device 102 providing, for example, a second identifier to client server 225, the client server may query or otherwise communicate with identity verifier 228 in regards to an identity verification determination made by identity verifier 228 with respect to communications device 102. Accordingly, by supplying a second identifier to client server 225, the client server may forward the second identifier to identity verifier 228. Identity verifier 228 may utilize the second identifier to present identity verification results to client server 225. In turn, client server 225 may determine whether to proceed with the transaction initiated by subscriber 205 and/or whether to terminate such transaction. Accordingly, it may be appreciated that communications device 102 providing a second identifier to client server 225 may operate to provide an indication to identity verifier 228 of a particular transaction for which client server 225 is inquiring. Upon presenting the identifier to identity verifier 228, the identity verifier may provide results of an identity verification process involving communications device 102.

In particular embodiments, after successfully proving that a subscriber is in possession of a particular communications device, identity verifier 228 may access database 230 to determine whether particular deterministic events have occurred with respect to communications device 102. As previously noted, such deterministic events may include, but are not limited to, recent porting of a subscriber account identifier (e.g., a telephone number) associated with communications device 102, recent replacement of a communications device, a recent request of a one-time-password associated with communications device 102, removal/replacement of a SIM of communications device 102, as well as any number of additional risk events associated with communications device 102. Responsive to determining whether such risk events have occurred and, perhaps, a frequency of occurrence of one or more risk events, identity verifier 228 may provide client server 225 with a trustworthiness score or trustworthiness measure. In accordance with business rules and/or business logic implemented by an institution directing the operations of client server 225, the transaction initiated by subscriber 205 may be allowed, or may be suspended until further parameters regarding mobile device 102 and/or subscriber 205 can be gathered, or may be disallowed entirely.

Figure 3:
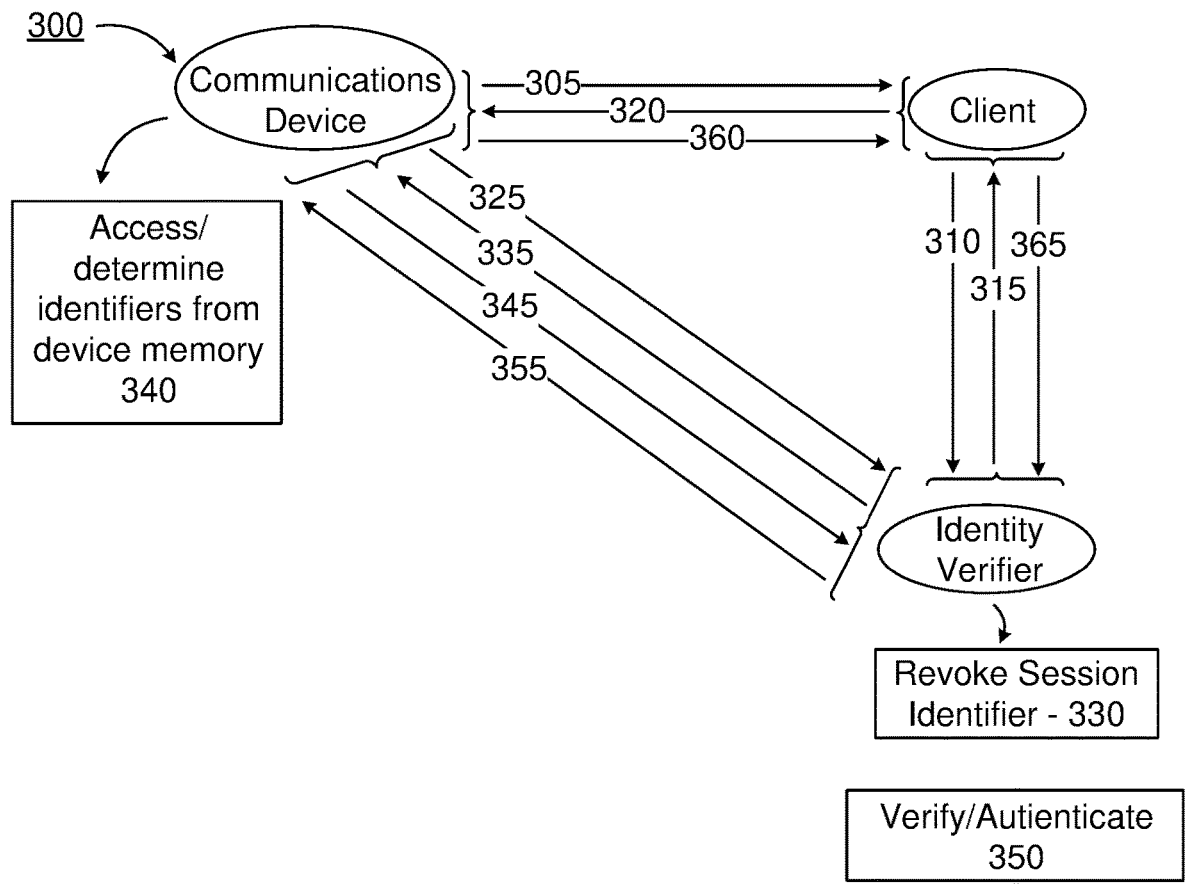
FIG. 3 is a diagram showing message flow between a communications device, a client server, and an identity verifier, according to an embodiment.

FIG. 3 is a diagram showing message flow between a communications device, a client server, and an identity verifier, according to an embodiment 300. In the embodiment of FIG. 3, a subscriber, such as subscriber 205 of FIG. 2, may be in possession of and/or be collocated with a communications device, such as communications device 102. A subscriber may wish to engage in a transaction, such as a financial transaction, a transaction to obtain privileged content (e.g., healthcare records, premium entertainment, etc.), utilizing a communications device. Thus, as shown in FIG. 3, a communications device may establish contact with a client server, such as client server 225, operating under the control and/or direction of, for example, a financial institution. In a manner similar to that of FIG. 2, a communications device may, such as in 305, transmit an indicator, such as an IP address, an alphanumeric combination, or any other type of signal that identifies or associates a communications device as being served or provisioned by a particular communication services carrier. In particular embodiments, an indicator may comprise an IP address, a Media Access Control (MAC) address, or an alphanumeric combination which may directly identify a carrier providing communication services. In the embodiment of FIG. 3, a communications device may establish a browser session with a client server, such as a browser session utilizing a mobile Internet service provider, or may operate without establishing a browser session with a client server. In either of these instances (or in a variety of other instances), responsive to an attempt by a subscriber to engage in a transaction, a client server may establish contact with an identity verifier, such as identity verifier 228 of FIG. 2, so as to obtain identity verification and/or authorization of a subscriber operating, or at least collocated with, a communications device. Responsive to establishing contact with an identity verifier, a client server may transmit, at 310, the indicator to an identity verifier.

Following receipt of an indicator from a client server, an identity verifier may generate a resource locator, such as a URL, which may be tailored to an indicator provided by a communications device. A resource locator may be returned to a client server, such as at 315. A client server may, in turn, transmit a resource locator to a communications device, such as at 320. A resource locator may include a session identifier formulated or generated by an identity verifier. Responsive to receipt of a resource locator, a communications device may establish a session directly with an identity verifier, such as at 325, utilizing a resource locator. The resource locator may correspond to the resource locator transmitted to the communications device, as in 320.

Following receipt of a session identifier from a communications device, an identity verifier may revoke or otherwise prevent reuse of a session identifier, such as at 330. In embodiments, revocation of a session identifier may ensure that an impersonator, such as an unscrupulous individual attempting to impersonate an owner of a particular communications device, is not able to engage in a potentially fraudulent transaction utilizing the session identifier at another time. Following revocation of a session identifier, an identity verifier may establish a browser session with a communications device, such as at 335. Establishing a browser session with a communications device may involve generation of at least one additional session identifier comprising one or more one-time-use tokens. During a browser session, perhaps, under the direction of an application program, for example, operating on a communications device, the communications device may access one or more device-specific identifiers stored in a memory of a communications device, such as an IMSI, an IMEI, an MSISDN, an ICC ID, or any combination thereof, such as at 340. At 345, one or more device-specific identifiers may be transmitted to an identity verifier. At 350, an identity verifier may verify and/or authenticate a communications device based, at least in part, on device-specific identifiers transmitted from a communications device, such as at 345. At 355, an identity verifier may redirect a communications device to reestablish communications with a client server. Also at 355, an identity verifier may instruct the communications device to present a second identifier to a client server. At 360, the communications device may present the second identifier to a client server which, in turn, may present the second identifier to an identity verifier, such as at 365. By presenting a second identifier to an identity verifier, a client server may receive any results of identity verification and/or authentication performed by an identity verifier for a particular device.

Figure 4:
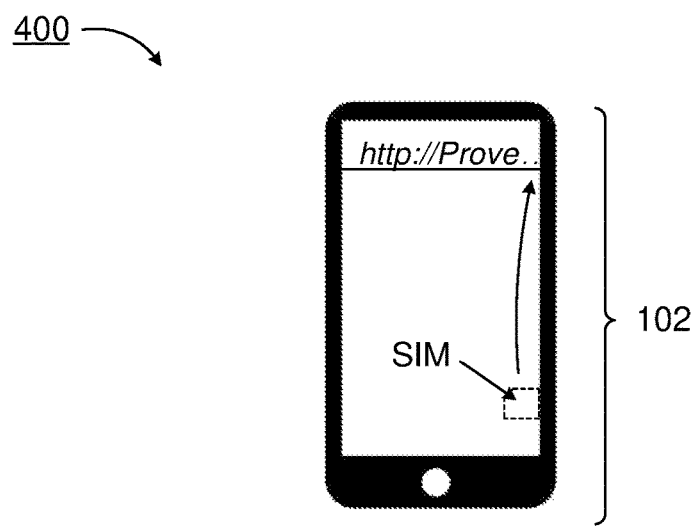
FIG. 4 shows a communications device determining or obtaining device-specific parameters from a SIM, according to an embodiment.

FIG. 4 shows a communications device accessing device-specific parameters from a SIM, according to an embodiment 400. In the embodiment of FIG. 4, communications device 102, while executing a browser session, may access device-specific parameters stored within memory locations of the device for transmittal to an identity verifier.

Figure 5:
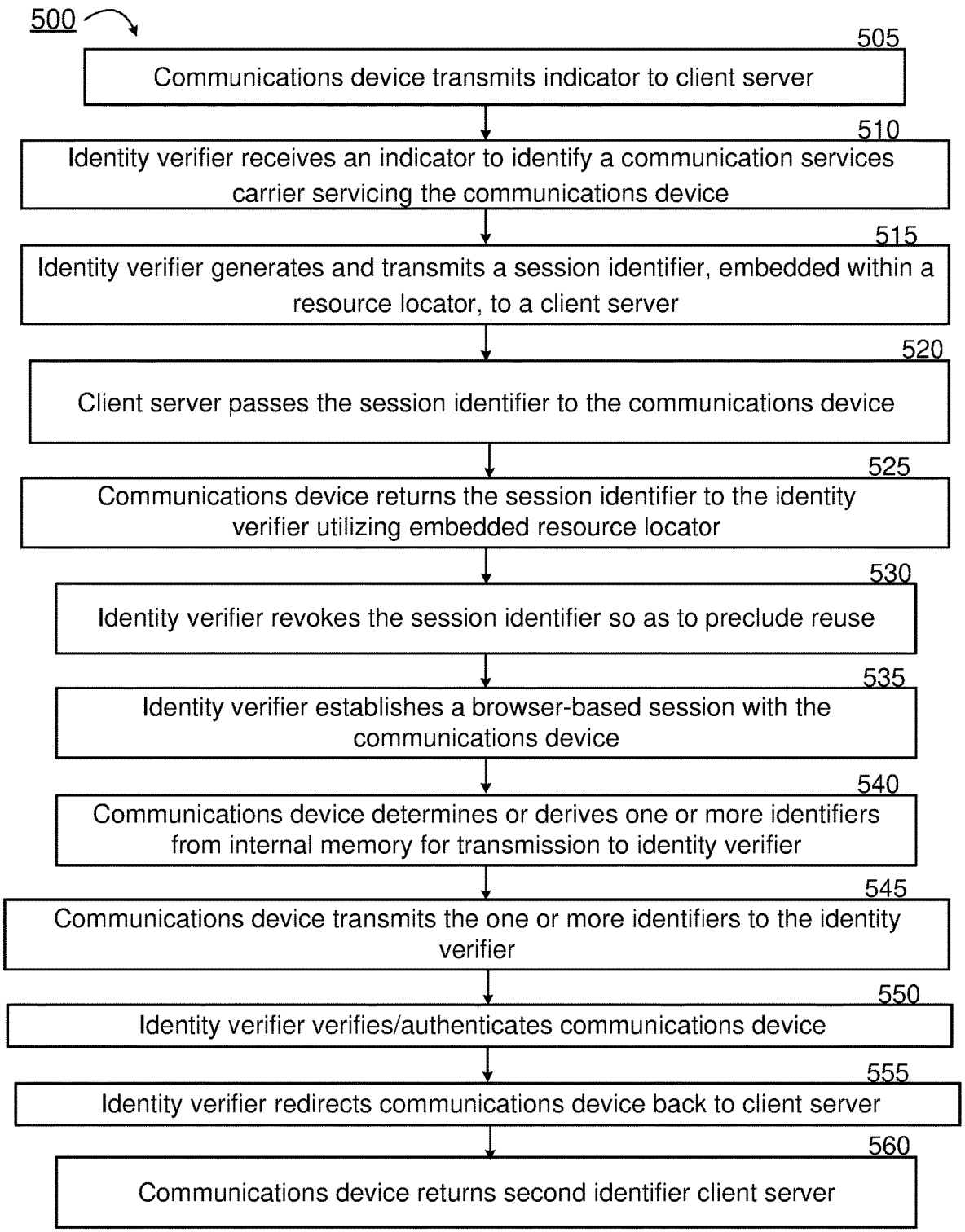
FIG. 5 shows a process of proving possession of a communications device via a directed connection to an identity verifier, according to an embodiment.

FIG. 5 shows a process of proving possession of a communications device via a directed connection to an identity verifier, according to an embodiment 500. It should be noted that the disclosed embodiments, such as the embodiment of FIG. 5, are intended to embrace numerous variations, including methods that may include actions in addition to those depicted in the figures, actions performed in an order different than those depicted in the figures, as well as methods including fewer steps than those depicted. The method of FIG. 5 begins at 505, which includes a communications device transmitting an indicator (e.g., an IP address, a MAC address, an alphanumeric combination, etc.) to a client server. An indicator may be utilized to identify a specific communications device to a communication services carrier providing services to the communications device. The client server may be operating under the control of an institution, such as a financial institution, for example. The method may continue at 510, which includes an identity verifier receiving the indicator indicating the communication services carrier providing services to the communications device.

At 515, an identity verifier may generate a tailored session identifier based, at least in part, on an indicator received from a communications device via a client server. In particular embodiments, a session identifier may be embedded or otherwise arranged within a resource locator (e.g., a URL). In addition, at 515, the session identifier may be transmitted to a communications device via a client server. Transmission of the session identifier may involve forwarding of the session identifier from the client server through a communications network (e.g., a mobile cellular communications network) to be received by the communications device, such as at 520. At 525, in response to receiving a session identifier, a communications device may be directed to establish communications with an identity verifier. In establishing a direct connection, a communications device may utilize a URL embedded within the session identifier. At 530, in response to receiving the session identifier via a direct connection with the communications device, an identity verifier may revoke the session identifier so as to prevent an unscrupulous individual, for example, from reusing the identifier to conduct a potentially fraudulent transaction.

At 535, an identity verifier may establish a browser session with the communications device. At 535, an identity verifier may transmit an additional session identifier, which may comprise one or more one-time-use tokens, to a communications device. At 540, under the control of a browser program executing on a communications device, the device may access or determine one or more device-specific identifiers, such as an IMSI, an IMEI, an MSISDN, an ICC ID, or any combination thereof. In particular embodiments, a browser program may direct a processor of the communications device to query one or more memory locations internal to the device to obtain device-specific identifiers. In particular embodiments, memory locations may correspond to memory addresses of a SIM that has been inserted into the communications device. At 545, the communications device may transmit the one or more device-specific identifiers to an identity verifier. At 550, an identity verifier may verify/authenticate a particular subscriber operating the communications device. Such verification/authentication of the subscriber operating the communications device may be based, at least in part, on proving that the particular subscriber is in possession of, or at least collocated with, the communications device. At 555, an identity verifier may provide a second identifier to the communications device and redirect the communications device to reestablish communications with a client server, such as the client/server referenced in relation to 505. At 560, following reestablishing communications with the client server, the communications device may provide the second identifier to the client server. By way of providing the second identifier to the client server, the client server may present the identifier to the identity verifier. In turn, the identity verifier may provide results of any verification/authentication activities involving the particular communications device.

Figure 6:
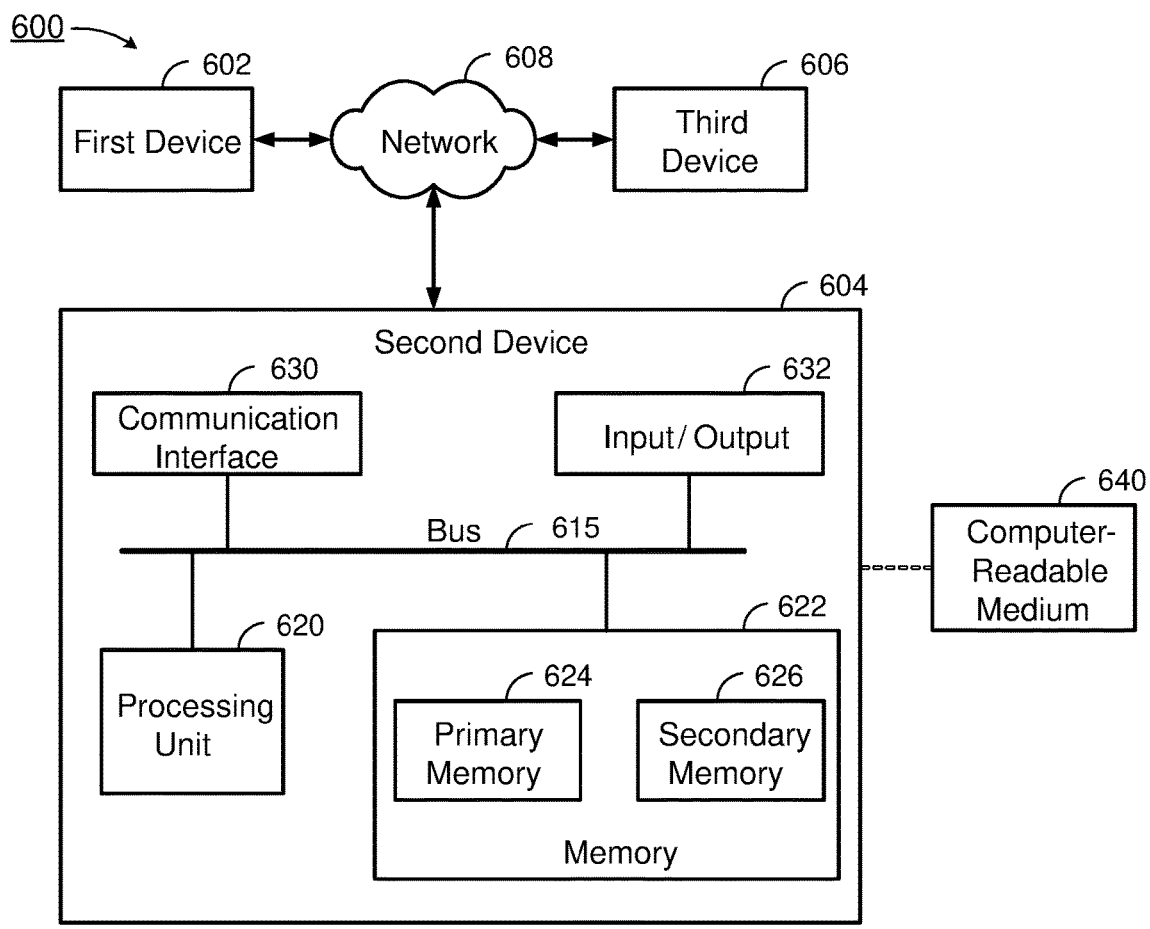
FIG. 6 is a diagram showing a computing environment, according to an embodiment.

FIG. 6 is a diagram showing a computing environment, according to an embodiment 600. In the embodiment of FIG. 6, first and third devices 602 and 606 may be capable of rendering a graphical user interface (GUI) for a network device, such as server device 140 of FIG. 1, so that a subscriber utilizing a communications device (e.g., a mobile communications device) may engage in system use. Device 604 may potentially serve a similar function in this illustration. Likewise, in FIG. 6, computing device 602 ('first device' in FIG. 6) may interface with computing device 604 ('second device' in FIG. 6), which may, for example, also comprise features of a client computing device and/or a server computing device, in an embodiment. Processor (e.g., processing device) 620 and memory 622, which may comprise primary memory 624 and secondary memory 626, may communicate by way of a communication interface 630, for example. The term "computing device," in the context of the present patent application, refers to a system and/or a device, such as a computing apparatus, that includes a capability to process (e.g., perform computations) and/or store digital content, such as electronic files, electronic documents, measurements, text, images, video, audio, etc. in the form of signals and/or states. Thus, a computing device, in the context of the present patent application, may comprise hardware, software, firmware, or any combination thereof (other than software per se). Computing device 604, as depicted in FIG. 6, is merely one example, and claimed subject matter is not limited in scope to this particular example.

In FIG. 6, computing device 602 may provide one or more sources of executable computer instructions in the form of physical states and/or signals (e.g., stored in memory states), for example. Computing device 602 may communicate with computing device 604 by way of a network connection, such as via network 608, for example. As previously mentioned, a connection, while physical, may be virtual while not necessarily being tangible. Although computing device 604 of FIG. 6 shows various tangible, physical components, claimed subject matter is not limited to a computing devices having only these tangible components as other implementations and/or embodiments may include alternative arrangements that may comprise additional tangible components or fewer tangible components, for example, that function differently while achieving similar results. Rather, examples are provided merely as illustrations. It is not intended that claimed subject matter be limited in scope to illustrative examples.

Memory 622 may comprise any non-transitory storage mechanism. Memory 622 may comprise, for example, primary memory 624 and secondary memory 626, additional memory circuits, mechanisms, or combinations thereof may be used. Memory 622 may comprise, for example, random access memory, read only memory, etc., such as in the form of one or more storage devices and/or systems, such as, for example, a disk drive including an optical disc drive, a tape drive, a solid-state memory drive, etc., just to name a few examples.

Memory 622 may comprise one or more articles utilized to store a program of executable computer instructions. For example, processor 620 may fetch executable instructions from memory and proceed to execute the fetched instructions. Memory 622 may also comprise a memory controller for accessing device readable-medium 640 that may carry and/or make accessible digital content, which may include code, and/or instructions, for example, executable by processor 620 and/or some other device, such as a controller, as one example, capable of executing computer instructions, for example. Under direction of processor 620, a non-transitory memory, such as memory cells storing physical states (e.g., memory states), comprising, for example, a program of executable computer instructions, may be executed by processor 620 and able to generate signals to be communicated via a network, for example, as previously described. Generated signals may also be stored in memory, also previously suggested.

Memory 622 may store electronic files and/or electronic documents, such as relating to one or more users, and may also comprise a machine-readable medium that may carry and/or make accessible content, including code and/or instructions, for example, executable by processor 620 and/or some other device, such as a controller, as one example, capable of executing computer instructions, for example. As previously mentioned, the term electronic file and/or the term electronic document are used throughout this document to refer to a set of stored memory states and/or a set of physical signals associated in a manner so as to thereby form an electronic file and/or an electronic document. That is, it is not meant to implicitly reference a particular syntax, format and/or approach used, for example, with respect to a set of associated memory states and/or a set of associated physical signals. It is further noted an association of memory states, for example, may be in a logical sense and not necessarily in a tangible, physical sense. Thus, although signal and/or state components of an electronic file and/or electronic document, are to be associated logically, storage thereof, for example, may reside in one or more different places in a tangible, physical memory, in an embodiment.

Algorithmic descriptions and/or symbolic representations are examples of techniques used by those of ordinary skill in the signal processing and/or related arts to convey the substance of their work to others skilled in the art. An algorithm is, in the context of the present patent application, and generally, is considered to be a self-consistent sequence of operations and/or similar signal processing leading to a desired result. In the context of the present patent application, operations and/or processing involve physical manipulation of physical quantities. Typically, although not necessarily, such quantities may take the form of electrical and/or magnetic signals and/or states capable of being stored, transferred, combined, compared, processed and/or otherwise manipulated, for example, as electronic signals and/or states making up components of various forms of digital content, such as signal measurements, text, images, video, audio, etc.

Processor 620 may comprise one or more circuits, such as digital circuits, to perform at least a portion of a computing procedure and/or process. By way of example, but not limitation, processor 620 may comprise one or more processors, such as controllers, micro-processors, micro-controllers, application specific integrated circuits, digital signal processors, programmable logic devices, field programmable gate arrays, the like, or any combination thereof. In various implementations and/or embodiments, processor 620 may perform signal processing, typically substantially in accordance with fetched executable computer instructions, such as to manipulate signals and/or states, to construct signals and/or states, etc., with signals and/or states generated in such a manner to be communicated and/or stored in memory, for example.

FIG. 6 also illustrates device 604 as including a component 632 operable with input/output devices, and communication bus 615, for example, so that signals and/or states may be appropriately communicated between devices, such as device 604 and an input device and/or device 604 and an output device. A user may make use of an input device, such as a computer mouse, stylus, track ball, keyboard, and/or any other similar device capable of receiving user actions and/or motions as input signals. Likewise, for a device having speech to text capability, a user may speak to generate input signals. Likewise, a user may make use of an output device, such as a display, a printer, etc., and/or any other device capable of providing signals and/or generating stimuli for a user, such as visual stimuli, audio stimuli and/or other similar stimuli.

Figure 7:
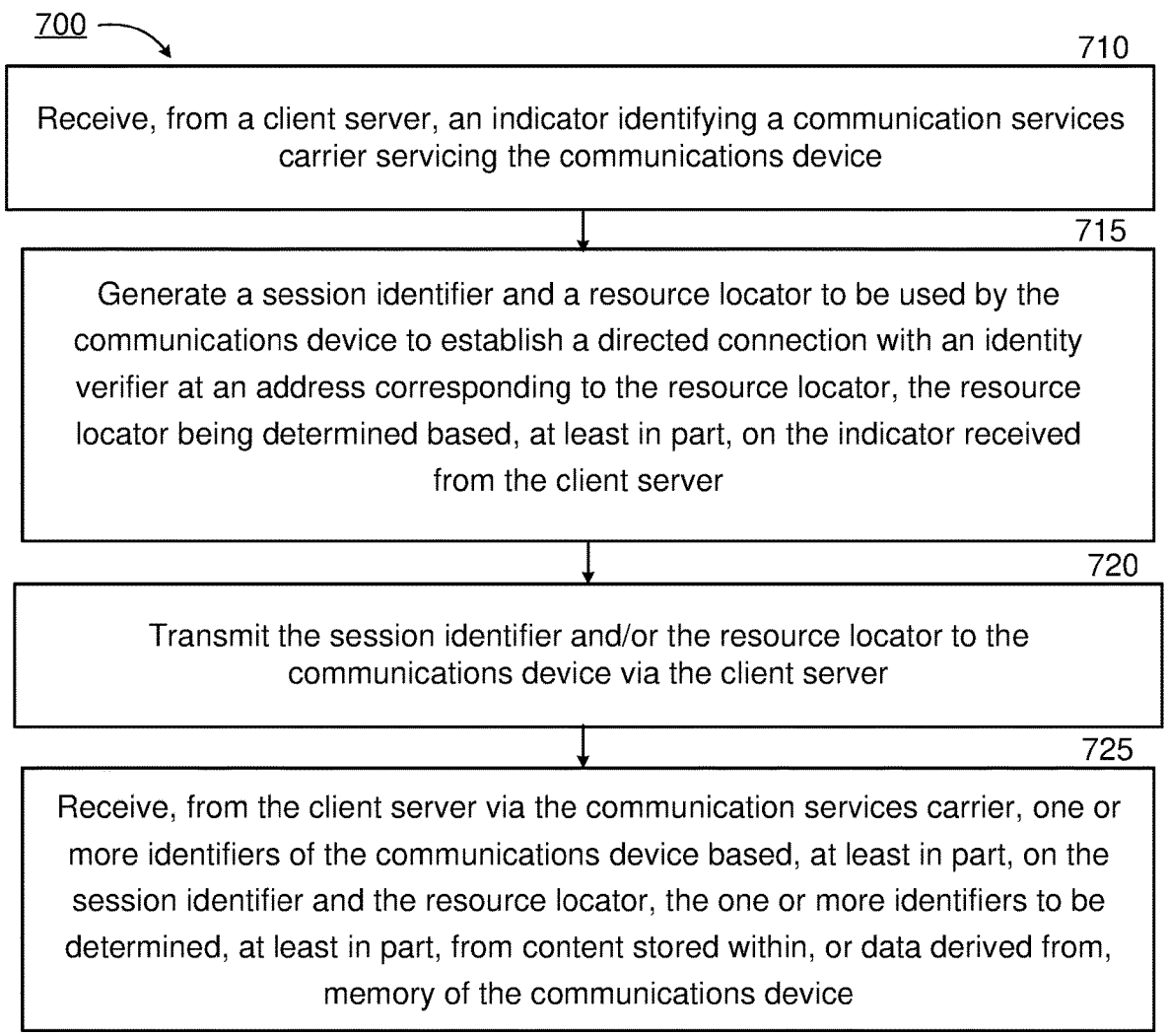
FIG. 7 is a flowchart for a process of proving possession of a communications device, according to an embodiment.

FIG. 7 is a flowchart for a process of proving possession of a communications device, according to an embodiment (700). The method of FIG. 7 begins at 710, which comprises receiving, from a client server, an indicator identifying a communication services carrier servicing the communications device. The method may continue at 715, which includes generating a session identifier and a resource locator to be used by the communications device to establish a directed connection with an identity verifier at and address corresponding to the resource locator. The resource locator may be determined based, at least in part, on the indicator received from the client server. The method may continue at 720, which includes transmitting the session identifier and/or the resource locator to the communications device via the client server. At 725, the method may continue with receiving, from the client server via the communication services carrier, one or more identifiers of the communications device based, at least in part, on the session identifier and the resource locator, the one or more identifiers to be determined, at least in part, from content stored within, or data derived from, memory of the communications device.

In the context of the present patent application, the term "connection," the term "component" and/or similar terms are intended to be physical, but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path comprising metal or other conductor, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Non-limiting illustrations of an electrical switch include a transistor, a diode, etc. However, a "connection" and/or "component," in a particular context of usage, likewise, although physical, can also be non-tangible, such as a connection between a client and a server over a network, particularly a wireless network, which generally refers to the ability for the client and server to transmit, receive, and/or exchange communications, as discussed in more detail later.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled," is used to mean that potentially two or more tangible components are tangibly in direct physical contact. Nonetheless, "coupled" is also used to mean that two or more tangible components and/or the like are not necessarily tangibly in direct physical contact, but are able to co-operate, liaise, and/or interact, such as, for example, by being "optically coupled." Likewise, the term "coupled" is also understood to mean indirectly connected. It is further noted, in the context of the present patent application, since memory, such as a memory component and/or memory states, is intended to be non-transitory, the term physical, at least if used in relation to memory necessarily implies that such memory components and/or memory states, continuing with the example, are tangible.

Additionally, in the present patent application, in a particular context of usage, such as a situation in which tangible components (and/or similarly, tangible materials) are being discussed, a distinction exists between being "on" and being "over." As an example, deposition of a substance "on" a substrate refers to a deposition involving direct physical and tangible contact without an intermediary, such as an intermediary substance, between the substance deposited and the substrate in this latter example; nonetheless, deposition "over" a substrate, while understood to potentially include deposition "on" a substrate (since being "on" may also accurately be described as being "over"), is understood to include a situation in which one or more intermediaries, such as one or more intermediary substances, are present between the substance deposited and the substrate so that the substance deposited is not necessarily in direct physical and tangible contact with the substrate.

A similar distinction is made in an appropriate particular context of usage, such as in which tangible materials and/or tangible components are discussed, between being "beneath" and being "under." While "beneath," in such a particular context of usage, is intended to necessarily imply physical and tangible contact (similar to "on," as just described), "under" potentially includes a situation in which there is direct physical and tangible contact, but does not necessarily imply direct physical and tangible contact, such as if one or more intermediaries, such as one or more intermediary substances, are present. Thus, "on" is understood to mean "immediately over" and "beneath" is understood to mean "immediately under."

It is likewise appreciated that terms such as "over" and "under" are understood in a similar manner as the terms "up," "down," "top," "bottom," and so on, previously mentioned. These terms may be used to facilitate discussion, but are not intended to necessarily restrict scope of claimed subject matter. For example, the term "over," as an example, is not meant to suggest that claim scope is limited to only situations in which an embodiment is right side up, such as in comparison with the embodiment being upside down, for example. An example includes a flip chip, as one illustration, in which, for example, orientation at various times (e.g., during fabrication) may not necessarily correspond to orientation of a final product. Thus, if an object, as an example, is within applicable claim scope in a particular orientation, such as upside down, as one example, likewise, it is intended that the latter also be interpreted to be included within applicable claim scope in another orientation, such as right side up, again, as an example, and vice-versa, even if applicable literal claim language has the potential to be interpreted otherwise. Of course, again, as always has been the case in the specification of a patent application, particular context of description and/or usage provides helpful guidance regarding reasonable inferences to be drawn.

Unless otherwise indicated, in the context of the present patent application, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Likewise, the term "based on" and/or similar terms are understood as not necessarily intending to convey an exhaustive list of factors, but to allow for existence of additional factors not necessarily expressly described.

Furthermore, it is intended, for a situation that relates to implementation of claimed subject matter and is subject to testing, measurement, and/or specification regarding degree, that the particular situation be understood in the following manner. As an example, in a given situation, assume a value of a physical property is to be measured. If alternatively reasonable approaches to testing, measurement, and/or specification regarding degree, at least with respect to the property, continuing with the example, is reasonably likely to occur to one of ordinary skill, at least for implementation purposes, claimed subject matter is intended to cover those alternatively reasonable approaches unless otherwise expressly indicated. As an example, if a plot of measurements over a region is produced and implementation of claimed subject matter refers to employing a measurement of slope over the region, but a variety of reasonable and alternative techniques to estimate the slope over that region exist, claimed subject matter is intended to cover those reasonable alternative techniques unless otherwise expressly indicated.

To the extent claimed subject matter is related to one or more particular measurements, such as with regard to physical manifestations capable of being measured physically, such as, without limit, temperature, pressure, voltage, current, electromagnetic radiation, etc., it is believed that claimed subject matter does not fall with the abstract idea judicial exception to statutory subject matter. Rather, it is asserted, that physical measurements are not mental steps and, likewise, are not abstract ideas.

It is noted, nonetheless, that a typical measurement model employed is that one or more measurements may respectively comprise a sum of at least two components. Thus, for a given measurement, for example, one component may comprise a deterministic component, which in an ideal sense, may comprise a physical value (e.g., sought via one or more measurements), often in the form of one or more signals, signal samples and/or states, and one component may comprise a random component, which may have a variety of sources that may be challenging to quantify. At times, for example, lack of measurement precision may affect a given measurement. Thus, for claimed subject matter, a statistical or stochastic model may be used in addition to a deterministic model as an approach to identification and/or prediction regarding one or more measurement values that may relate to claimed subject matter.

For example, a relatively large number of measurements may be collected to better estimate a deterministic component. Likewise, if measurements vary, which may typically occur, it may be that some portion of a variance may be explained as a deterministic component, while some portion of a variance may be explained as a random component. Typically, it is desirable to have stochastic variance associated with measurements be relatively small, if feasible. That is, typically, it may be preferable to be able to account for a reasonable portion of measurement variation in a deterministic manner, rather than a stochastic matter as an aid to identification and/or predictability.

Along these lines, a variety of techniques have come into use so that one or more measurements may be processed to better estimate an underlying deterministic component, as well as to estimate potentially random components. These techniques, of course, may vary with details surrounding a given situation. Typically, however, more complex problems may involve use of more complex techniques. In this regard, as alluded to above, one or more measurements of physical manifestations may be modeled deterministically and/or stochastically. Employing a model permits collected measurements to potentially be identified and/or processed, and/or potentially permits estimation and/or prediction of an underlying deterministic component, for example, with respect to later measurements to be taken. A given estimate may not be a perfect estimate; however, in general, it is expected that on average one or more estimates may better reflect an underlying deterministic component, for example, if random components that may be included in one or more obtained measurements, are considered. Practically speaking, of course, it is desirable to be able to generate, such as through estimation approaches, a physically meaningful model of processes affecting measurements to be taken.

In some situations, however, as indicated, potential influences may be complex. Therefore, seeking to understand appropriate factors to consider may be particularly challenging. In such situations, it is, therefore, not unusual to employ heuristics with respect to generating one or more estimates. Heuristics refers to use of experience related approaches that may reflect realized processes and/or realized results, such as with respect to use of historical measurements, for example. Heuristics, for example, may be employed in situations where more analytical approaches may be overly complex and/or nearly intractable. Thus, regarding claimed subject matter, an innovative feature may include, in an example embodiment, heuristics that may be employed, for example, to estimate and/or predict one or more measurements.

It is further noted that the terms "type" and/or "like," if used, such as with a feature, structure, characteristic, and/or the like, using "optical" or "electrical" as simple examples, means at least partially of and/or relating to the feature, structure, characteristic, and/or the like in such a way that presence of minor variations, even variations that might otherwise not be considered fully consistent with the feature, structure, characteristic, and/or the like, do not in general prevent the feature, structure, characteristic, and/or the like from being of a "type" and/or being "like," (such as being an "optical-type" or being "optical-like," for example) if the minor variations are sufficiently minor so that the feature, structure, characteristic, and/or the like would still be considered to be substantially present with such variations also present. Thus, continuing with this example, the terms optical-type and/or optical-like properties are necessarily intended to include optical properties. Likewise, the terms electrical-type and/or electrical-like properties, as another example, are necessarily intended to include electrical properties. It should be noted that the specification of the present patent application merely provides one or more illustrative examples and claimed subject matter is intended to not be limited to one or more illustrative examples; however, again, as has always been the case with respect to the specification of a patent application, particular context of description and/or usage provides helpful guidance regarding reasonable inferences to be drawn.

With advances in technology, it has become more typical to employ distributed computing and/or communication approaches in which portions of a process, such as signal processing of signal samples, for example, may be allocated among various devices, including one or more communications devices and/or one or more server devices, via a computing and/or communications network, for example. A network may comprise two or more devices, such as network devices and/or computing devices, and/or may couple devices, such as network devices and/or computing devices, so that signal communications, such as in the form of signal packets and/or signal frames (e.g., comprising one or more signal samples), for example, may be exchanged, such as between a client server device and/or a communications device, as well as other types of devices, including between wired and/or wireless devices coupled via a wired and/or wireless network, for example.

In the context of the present patent application, the term network device refers to any device capable of communicating via and/or as part of a network and may comprise a computing device. While network devices may be capable of communicating signals (e.g., signal packets and/or frames), such as via a wired and/or wireless network, they may also be capable of performing operations associated with a computing device, such as arithmetic and/or logic operations, processing and/or storing operations (e.g., storing signal samples), such as in memory as tangible, physical memory states, and/or may, for example, operate as a communications device and/or a client server device in various embodiments. Network devices capable of operating as a client server, may include, as examples, dedicated rack-mounted servers, desktop computers, laptop computers, set top boxes, tablets, netbooks, smart phones, wearable devices, integrated devices combining two or more features of the foregoing devices, and/or the like, or any combination thereof. As mentioned, signal packets and/or frames, for example, may be exchanged, such as between a server device and/or a communications device, as well as other types of devices, including between wired and/or wireless devices coupled via a wired and/or wireless network, for example, or any combination thereof. It is noted that the terms, server, server device, server computing device, server computing platform and/or similar terms are used interchangeably.

It should be understood that for ease of description, a network device (also referred to as a networking device) may be embodied and/or described in terms of a computing device and vice-versa. However, it should further be understood that this description should in no way be construed so that claimed subject matter is limited to one embodiment, such as only a computing device and/or only a network device, but, instead, may be embodied as a variety of devices or combinations thereof, including, for example, one or more illustrative examples.

In the context of the present patent application, the term sub-network and/or similar terms, if used, for example, with respect to a network, refers to the network and/or a part thereof. Sub-networks may also comprise links, such as physical links, connecting and/or coupling nodes, so as to be capable to communicate signal packets and/or frames between devices of particular nodes, including via wired links, wireless links, or combinations thereof. Various types of devices, such as network devices and/or computing devices, may be made available so that device interoperability is enabled and/or, in at least some instances, may be transparent. In the context of the present patent application, the term "transparent," if used with respect to devices of a network, refers to devices communicating via the network in which the devices are able to communicate via one or more intermediate devices, such as one or more intermediate nodes, but without the communicating devices necessarily specifying the one or more intermediate nodes and/or the one or more intermediate devices of the one or more intermediate nodes and/or, thus, may include within the network the devices communicating via the one or more intermediate nodes and/or the one or more intermediate devices of the one or more intermediate nodes, but may engage in signal communications as if such intermediate nodes and/or intermediate devices are not necessarily involved. For example, a router may provide a link and/or connection between otherwise separate and/or independent LANs.

The term electronic file and/or the term electronic document are used throughout this document to refer to a set of stored memory states and/or a set of physical signals associated in a manner so as to thereby, at least logically, form a file (e.g., electronic) and/or an electronic document. That is, it is not meant to implicitly reference a particular syntax, format and/or approach used, for example, with respect to a set of associated memory states and/or a set of associated physical signals. If a particular type of file storage format and/or syntax, for example, is intended, it is referenced expressly. It is further noted an association of memory states, for example, may be in a logical sense and not necessarily in a tangible, physical sense. Thus, although signal and/or state components of a file and/or an electronic document, for example, are to be associated logically, storage thereof, for example, may reside in one or more different places in a tangible, physical memory, in an embodiment.

Also, for one or more embodiments, an electronic document and/or electronic file may comprise a number of components. As previously indicated, in the context of the present patent application, a component is physical, but is not necessarily tangible. As an example, components with reference to an electronic document and/or electronic file, in one or more embodiments, may comprise text, for example, in the form of physical signals and/or physical states (e.g., capable of being physically displayed). Typically, memory states, for example, comprise tangible components, whereas physical signals are not necessarily tangible, although signals may become (e.g., be made) tangible, such as if appearing on a tangible display, for example, as is not uncommon. Also, for one or more embodiments, components with reference to an electronic document and/or electronic file may comprise a graphical object, such as, for example, an image, such as a digital image, and/or sub-objects, including attributes thereof, which, again, comprise physical signals and/or physical states (e.g., capable of being tangibly displayed). In an embodiment, digital content may comprise, for example, text, images, audio, video, and/or other types of electronic documents and/or electronic files, including portions thereof, for example.

For one or more embodiments, a device, such as a computing device and/or networking device, may comprise, for example, any of a wide range of digital electronic devices, including, but not limited to, desktop and/or notebook computers, high-definition televisions, digital versatile disc (DVD) and/or other optical disc players and/or recorders, game consoles, satellite television receivers, cellular telephones, tablet devices, wearable devices, personal digital assistants, mobile audio and/or video playback and/or recording devices, Internet of Things (IoT) type devices, or any combination of the foregoing. Further, unless specifically stated otherwise, a process as described, such as with reference to flow diagrams and/or otherwise, may also be executed and/or affected, in whole or in part, by a computing device and/or a network device. A device, such as a computing device and/or network device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, global positioning system (GPS) and/or other location-identifying type capability, and/or a display with a higher degree of functionality, such as a touch-sensitive color 2D or 3D display, for example.

As suggested previously, communications between a computing device and/or a network device and a wireless network may be in accordance with known and/or to be developed network protocols including, for example, global system for mobile communications (GSM), enhanced data rate for GSM evolution (EDGE), 802.11b/g/n/h, etc., and/or worldwide interoperability for microwave access (WiMAX). As suggested previously, a computing device and/or a networking device may also have a subscriber identity module (SIM) card, which, for example, may comprise a detachable or embedded smart card that is able to store subscription content of a user, and/or is also able to store a contact list. It is noted, as previously mentioned, that a SIM card may also be electronic in the sense that it may simply be sorted in a particular location in memory of the computing and/or networking device. A user may own the computing device and/or network device or may otherwise be a user, such as a primary user, for example. A device may be assigned an address by a wireless network operator, a wired network operator, and/or an Internet Service Provider (ISP). For example, an address may comprise a domestic or international telephone number, an Internet Protocol (IP) address, and/or one or more other identifiers. In other embodiments, a computing and/or communications network may be embodied as a wired network, wireless network, or any combinations thereof.

A computing and/or network device may include and/or may execute a variety of now known and/or to be developed operating systems, derivatives and/or versions thereof, including computer operating systems, such as Windows, iOS, Linux, a mobile operating system, such as iOS, Android, Windows Mobile, and/or the like. A computing device and/or network device may include and/or may execute a variety of possible applications, such as a communications device application enabling communication with other devices. For example, one or more messages (e.g., content) may be communicated, such as via one or more protocols, now known and/or later to be developed, suitable for communication of email, short message service (SMS), and/or multimedia message service (MMS), including via a network, such as a social network, formed at least in part by a portion of a computing and/or communications network. A computing and/or network device may also include executable computer instructions to process and/or communicate digital content, such as, for example, textual content, digital multimedia content, and/or the like. A computing and/or network device may also include executable computer instructions to perform a variety of possible tasks, such as browsing, searching, playing various forms of digital content, including locally stored and/or streamed video, and/or games such as, but not limited to, fantasy sports leagues. The foregoing is provided merely to illustrate that claimed subject matter is intended to include a wide range of possible features and/or capabilities.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. A method of proving possession of a communications device, comprising:
receiving, from a client server, an indicator identifying a communication services carrier servicing the communications device, the indicator comprising an Internet protocol (IP) address assigned to the communication services carrier or an alphanumeric combination identifying the communication services carrier, or a combination thereof;
generating, by an identity verifier, a session identifier, wherein placement of one or more fields or parameters of the session identifier is varied based at least in part on the indicator identifying the communications services carrier;
generating, by the identity verifier and based, at least in part, on the indicator identifying the communication services carrier, a tailored resource locator, the tailored resource locator and the session identifier to facilitate transmission via the identified communication services carrier for transmission from the client server to the communications device, the tailored resource locator and the session identifier to be used by the communications device to establish a directed connection with the identity verifier at an address corresponding to the tailored resource locator;

transmitting at least one of the session identifier and the tailored resource locator to the communications device via the client server; and receiving, from the client server via the communication services carrier, one or more identifiers of the communications device based, at least in part, on the session identifier and the tailored resource locator, the one or more identifiers to be determined, at least in part, from content stored within, or data derived from, memory of the communications device.

2. The method of claim 1, further comprising:
determining identity of the communications device based, at least in part, on the received one or more identifiers.

3. The method of claim 2, wherein the received one or more identifiers comprise a telephone number, an International Mobile Subscriber Identifier (IMSI), an Integrated Circuit Card Identifier (ICC ID), an International Mobile Equipment Identifier (IMEI), a Mobile Station International Subscriber Directory Number (MSISDN), a Media Access Control (MAC) address, or any combination thereof.

4. The method of claim 1, wherein the tailored resource locator corresponds to a uniform resource locator (URL).

5. The method of claim 1, wherein the session identifier comprises one or more one-time-use tokens.

6. The method of claim 1, wherein the indicator identifying the communication services carrier comprises an alphanumeric combination.

7. The method of claim 1, wherein the indicator identifying the communication services carrier comprises an Internet protocol (IP) address.

8. The method of claim 7, further comprising:
the identity verifier accessing a data store to determine the communication services carrier providing services to the communications device based, at least in part, on the IP address.

9. The method of claim 1, further comprising:
the identity verifier:
receiving the session identifier from the communications device; and
revoking the session identifier so as to preclude a further use of the session identifier.

10. The method of claim 1, further comprising:
generating, via the identity verifier, at least one additional session identifier; and
establishing a browser based session with the communications device, based at least in part on the at least one additional session identifier.

11. The method of claim 10, wherein the at least one additional session identifier comprises one or more additional one-time-use tokens.

12. The method of claim 1, wherein the memory of the communications device corresponds to one or more memory locations on a subscriber identity module (SIM).

13. An identity verifier comprising a processor coupled to at least one memory device, the processor coupled to the at least one memory device to:
receive, from a client server, an indicator to identify a communication services carrier to provide service to a communications device, the indicator to comprise an Internet protocol (IP) address assigned to the communication services carrier or an alphanumeric combination to identify the communication services carrier, or a combination thereof;

generate, by an identity verifier, a session identifier, wherein placement of one or more fields or parameters of the session identifier is to be varied based at least in part on the indicator to identify the communications services carrier;

generate, by the identity verifier and based, at least in part, on the indicator to identify the communication services carrier a tailored resource locator, the tailored resource locator and the session identifier to facilitate transmission via the identified communication services carrier for transmission from the client server to the communications device, the tailored resource locator and the session identifier to be used by the communications device to establish a directed connection with the identity verifier at an address to correspond to the tailored resource locator;

transmit the session identifier and the tailored resource locator to the communications device via the client server; and receive, from the client server via the communication services carrier, one or more identifiers of the communications device based, at least in part, on the session identifier and the tailored resource locator, the one or more identifiers to be determined, at least in part, from content stored within, or data derived from, memory of the communications device.

14. The identity verifier of claim 13, wherein one or more identifiers comprises a telephone number, an International Mobile Subscriber Identifier (IMSI), an Integrated Circuit Card Identifier (ICC ID), an International Mobile Equipment Identifier (IMEI), a Mobile Station International Subscriber Directory Number (MSISDN), a Media Access Control (MAC) address, or any combination thereof.

15. The identity verifier of claim 13, wherein the tailored resource locator corresponds to a uniform resource locator (URL).

16. The identity verifier of claim 13, wherein the session identifier comprises one or more one-time-use tokens.

17. The identity verifier of claim 13, wherein the indicator to identify the communication services carrier comprises an alphanumeric combination.

18. The identity verifier of claim 13, wherein the indicator to identify the communication services carrier comprises an Internet protocol (IP) address.

19. The identity verifier of claim 18, wherein the processor and the at least one memory are additionally to access a data store to determine the communication services carrier to provide services to the communications device based, at least in part, on the IP address.

20. The identity verifier of claim 13, wherein the processor and the at least one memory are additionally to:
receive the session identifier from the communications device; and
revoke the session identifier so as to preclude a further use of the session identifier.

21. The identity verifier of claim 13, wherein the processor and the at least one memory are additionally to:
generate, via the identity verifier, at least one additional session identifier; and
establish a browser based session with the communications device, based at least in part on the at least one additional session identifier.

22. The identity verifier of claim 21, wherein the at least one additional session identifier comprises one or more additional one-time-use tokens.

23. An article comprising:
a non-transitory storage medium having instructions stored thereon executable by a special-purpose computing platform to:
receive, from a client server, an indicator to identify a communication services carrier to provide service to a communications device, the indicator to comprise an Internet protocol (IP) address assigned to the communication services carrier or an alphanumeric combination to identify the communication services carrier, or a combination thereof;
generate, by an identity verifier, a session identifier, wherein placement of one or more fields or parameters of the session identifier is to be varied based at least in part on the indicator to identify the communications services carrier;
generate, by the identity verifier and based, at least in part, on the indicator to identify the communication services carrier, a tailored resource locator, the tailored resource locator and the session identifier to facilitate transmission via the identified communication services carrier for transmission from the client server to the communications device, the tailored resource locator and the session identifier to be used by the communications device to establish a directed connection with an identity verifier at an address to correspond to the tailored resource locator;
transmit the session identifier and the tailored resource locator to the communications device via the client server; and to
receive, from the client server via the communication services carrier, one or more identifiers of the communications device based, at least in part, on the session identifier and the tailored resource locator, the one or more identifiers to be determined, at least in part, from content stored within, or data derived from, memory of the communications device.

24. The article of claim 23, wherein the instructions stored on the non-transitory storage medium are additionally to:
access a data store to determine the communication services carrier to provide services to the communications device based, at least in part, on an Internet protocol (IP) address referred to by the indicator.

25. The article of claim 24, wherein the tailored resource locator comprises the session identifier, and wherein the tailored resource locator is to be received by the communications device via the client server.

26. The article of claim 24, wherein the instructions stored on the non-transitory storage medium are additionally to:
receive from the communications device, via the client server, the session identifier;
responsive to receipt of the session identifier, revoke the session identifier so as to preclude further use of the session identifier;
establish a browser-based session with the communications device; and
access the data store to determine one or more deterministic events with respect to the communications device.

27. A communications device, comprising at least one processor coupled to at least one memory device to:
receive a tailored resource locator from an identity verifier, the tailored resource locator to have been tailored by the identity verifier based, at least in part, on a communication services carrier, of a plurality of communication services carriers, identified via an indicator transmitted by the communications device, the indicator to comprise an Internet protocol (IP) address assigned to the communication services carrier or an alphanumeric combination to identify the communication services carrier, or a combination thereof, the tailored resource locator to comprise a session identifier, the placement of one or more fields or parameters of the session identifier to be varied based at least in part on the indicator, wherein the tailored resource locator and the session identifier to facilitate transmission via the identified communication services carrier for transmission from a client server to the communications device;
in response to receipt of the tailored resource locator and the session identifier, establish communications with a computing device at a logical location to correspond to the tailored resource locator under direction of the identity verifier;
establish a browser-based session with the identity verifier; and
transmit one or more identifiers to be determined, at least in part, from content stored within, or data derived from, memory of the communications device, to the identity verifier in response to one or more queries from the identity verifier.

28. The communications device of claim 27, wherein the tailored resource locator corresponds to a uniform resource locator (URL).

29. The communications device of claim 28, wherein the session identifier is generated responsive to receipt of the indicator.

30. The communications device of claim 29, wherein the indicator corresponds to an alphanumeric combination to indicate the identified communication services carrier.

* * * * *